(12) United States Patent
Iino et al.

(10) Patent No.: US 9,934,799 B2
(45) Date of Patent: Apr. 3, 2018

(54) PRELOADED ROLLER BEARING DEVICE, INFORMATION RECORDING AND REPRODUCING DEVICE, AND MANUFACTURING METHOD FOR BEARING DEVICE

(71) Applicant: SEIKO INSTRUMENTS INC., Chiba-shi, Chiba (JP)

(72) Inventors: Akihiro Iino, Chiba (JP); Masami Oaku, Chiba (JP); Takayuki Kosaka, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 0 days.

(21) Appl. No.: 15/366,342

(22) Filed: Dec. 1, 2016

(65) Prior Publication Data
US 2017/0186453 A1 Jun. 29, 2017

(30) Foreign Application Priority Data
Dec. 25, 2015 (JP) .................................. 2015-255054

(51) Int. Cl.
G11B 5/48 (2006.01)
F16C 19/06 (2006.01)
(Continued)

(52) U.S. Cl.
CPC ............ *G11B 5/4813* (2013.01); *F16C 19/06* (2013.01); *F16C 19/163* (2013.01); *F16C 19/166* (2013.01); *F16C 33/3806* (2013.01); *F16C 33/60* (2013.01); *F16C 33/7806* (2013.01); *F16C 43/065* (2013.01); *F16C 2370/12* (2013.01)

(58) Field of Classification Search
CPC ........ G11B 5/4813; F16C 33/60; F16C 19/06; F16C 19/163
USPC ........... 360/265.4, 265.5; 384/570, 571, 499, 384/506
See application file for complete search history.

(56) References Cited

U.S. PATENT DOCUMENTS 6,318,899 B1 * 11/2001 Boyd .................... F02F 7/0087
384/492
6,325,180 B1 * 12/2001 De Vries ................. F16C 33/60
188/162

(Continued)

OTHER PUBLICATIONS

Abstract, Publication No. JP 2009-191895, Publication date Aug. 27, 2009.

*Primary Examiner* — Jefferson Evans
(74) *Attorney, Agent, or Firm* — Bruce L. Adams; Klintworth & Rozenblat IP LLP

(57) ABSTRACT

A bearing device includes a shaft and a roller bearing externally inserted over the shaft. The roller bearing includes an inner ring disposed coaxially with a center axis of the shaft, an outer ring surrounding the inner ring from an outer side in a radial direction, and a plurality of rolling elements held between the inner ring and the outer ring to be capable of rolling. The inner ring is divided into one half section and the other half section. The one half section contacts the rolling elements from the one side toward the other side in the axial direction, and the other half section contacts the rolling elements from the other side toward the one side in the axial direction. Preloads are applied to the two half sections in directions in which the one half section and the other half section are brought close to each other.

16 Claims, 20 Drawing Sheets

(51) Int. Cl.
    *F16C 19/16*     (2006.01)
    *F16C 33/38*     (2006.01)
    *F16C 33/60*     (2006.01)
    *F16C 33/78*     (2006.01)
    *F16C 43/06*     (2006.01)

(56) References Cited

U.S. PATENT DOCUMENTS

| | | | | |
|---|---|---|---|---|
| 8,690,446 | B2* | 4/2014 | Habibvand | F16C 19/52 384/493 |
| 8,985,857 | B2* | 3/2015 | Schmidt | F01D 25/125 384/475 |
| 2004/0130827 | A1* | 7/2004 | Oveyssi | F16C 21/00 360/265.2 |
| 2004/0136116 | A1* | 7/2004 | Koyama | G11B 5/4813 360/265.2 |
| 2005/0146809 | A1* | 7/2005 | Aoyagi | G11B 5/4813 360/265.6 |
| 2010/0150490 | A1* | 6/2010 | Cymbal | F16C 33/60 384/569 |
| 2011/0007991 | A1* | 1/2011 | Miller | F16C 33/6659 384/474 |
| 2014/0119685 | A1* | 5/2014 | Thomas | F16C 19/06 384/614 |
| 2014/0153855 | A1* | 6/2014 | Adane | F16C 19/163 384/473 |
| 2016/0032975 | A1* | 2/2016 | Dupuis | B62D 1/16 384/506 |
| 2016/0040711 | A1* | 2/2016 | Boufflert | F16C 25/083 384/500 |

* cited by examiner

PRELOADED ROLLER BEARING DEVICE, INFORMATION RECORDING AND REPRODUCING DEVICE, AND MANUFACTURING METHOD FOR BEARING DEVICE

BACKGROUND OF THE INVENTION

1. Field of the Invention

The present invention relates to a bearing device, an information recording and reproducing device, and a manufacturing method for the bearing device.

2. Description of the Related Art

There has been known an information recording and reproducing device such as a hard disk drive that causes a disk (a magnetic recording medium) to store and reproduce various kinds of information. In general, the information recording and reproducing device includes a head gimbal assembly including a slider for recording a signal in and reproducing a signal from the disk and an arm (a turning member), to the distal end side of which the head gimbal assembly is attached. The arm is enabled to turn by a bearing device provided on the proximal end side. By turning the arm, it is possible to move the slider to a predetermined position of the disk and perform recording and reproduction of a signal.

In general, the bearing device includes a shaft and a pair of roller bearings inserted over the shaft and disposed side by side in the axial direction of the shaft. The pair of roller bearings respectively includes inner rings fixed to the shaft, outer rings surrounding the inner rings, and pluralities of rolling elements disposed between the inner rings and the outer rings (see, for example, JP-A-2009-191895 (Patent Literature 1)).

In such a bearing device, inner gaps between the outer and inner rings and the rolling elements are eliminated and rigidity of the roller bearings is increased by applying preloads in directions in which the inner rings of the pair of roller bearings are brought close to each other. In order to dispose the roller bearings in a state in which the preloads are applied thereto, it is necessary to dispose the pair of roller bearings side by side in the axial direction and fix the inner rings to the shaft in the state in which the preloads are applied thereto.

In recent years, a reduction in the thickness of an information recording and reproducing device has been in progress. However, in the bearing device in the related art, the pair of roller bearings is disposed side by side in the axial direction in order to increase the rigidity of the roller bearings. Therefore, there is a limit in the reduction in the thickness.

SUMMARY OF THE INVENTION

Therefore, the present invention provides a bearing device, an information recording and reproducing device, and a manufacturing method for the bearing device that enable a reduction in thickness.

A bearing device of the present invention includes: a shaft; and a roller bearing externally inserted over the shaft. The roller bearing includes: an inner ring disposed coaxially with a center axis of the shaft; an outer ring surrounding the inner ring from an outer side in a radial direction of the shaft; and a plurality of rolling elements held between the inner ring and the outer ring to be capable of rolling. At least one of the inner ring and the outer ring includes one half section disposed on one side in an axial direction of the center axis and the other half section disposed on the other side in the axial direction. The one half section is in contact with the rolling elements from the one side toward the other side in the axial direction. The other half section is in contact with the rolling elements from the other side toward the one side in the axial direction. Preloads are applied to the one half section and the other half section in directions in which the one half section and the other half section come close to each other.

According to the present invention, the one half section is in contact with the rolling elements from the one side toward the other side in the axial direction. The other half section is in contact with the rolling elements from the other side toward the one side in the axial direction. The preloads are applied to the one half section and the other half section in directions in which the one half section and the other half section come close to each other. Therefore, the rolling elements can be pressed in the radial direction by the one half section and the other half section. Consequently, it is possible to apply the preloads with one roller bearing. It is possible to eliminate inner gaps between the inner and outer rings and the rolling elements and increase the rigidity of the roller bearing. Therefore, it is possible to reduce the thickness of the bearing device compared with the configuration in which the pair of roller bearings is used as in the related art.

In the bearing device, it is desirable that the inner ring is divided into the one half section and the other half section.

According to the present invention, it is possible to apply the preload to the inner ring. It is possible to increase the rigidity of the roller bearing. Therefore, it is possible to reduce the thickness of the bearing device.

In the bearing device, it is desirable that the bearing device further includes a retainer formed in an annular shape and configured to hold the rolling elements to be capable of rolling, and an inner circumferential edge of the retainer projects in the axial direction and is disposed between the one half section and the other half section.

According to the present invention, a contact part of the retainer and the inner ring can be limited to only the inner circumferential edge of the retainer projecting in the axial direction. Consequently, compared with a configuration in which the retainer is in contact with the inner ring in a region other than the inner circumferential edge, it is possible to reduce a sliding area of the retainer and the inner ring at the time when the retainer rotates with respect to the inner ring. It is possible to set the retainer and the inner ring in contact in a position at a shorter distance to a rotation center. Therefore, it is possible to reduce sliding resistance between the retainer and the inner ring and suppress a loss of rotation torque. It is possible to realize the bearing device having low torque.

In the bearing device, it is desirable that at least a part of the inner ring is formed integrally with the shaft.

According to the present invention, it is possible to reduce the number of components. Therefore, it is possible to reduce the cost of the bearing device.

In the bearing device, it is desirable that the outer ring is divided into the one half section and the other half section.

According to the present invention, it is possible to apply the preload to the outer ring. It is possible to increase the rigidity of the roller bearing. Therefore, it is possible to reduce the thickness of the bearing device.

In the bearing device, it is desirable that the outer ring is held by an externally inserted member externally inserted over the one half section and the other half section.

According to the present invention, the one half section and the other half section can be held by the externally inserted member in a state in which the preloads are applied thereto. Consequently, the state in which the preloads are applied to the one half section and the other half section can be maintained by the roller bearing alone. Therefore, in the configuration in which the outer ring includes the one half section and the other half section, it is possible to assemble the bearing device without preparing, for example, a member to which the bearing device is attached. Therefore, it is possible to improve manufacturing efficiency. It is possible to reduce the cost of the bearing device.

In the bearing device, it is desirable that one of the one half section and the other half section of the outer ring is formed integrally with the externally inserted member.

According to the present invention, it is possible to reduce the number of components. Therefore, it is possible to reduce the cost of the bearing device.

In the bearing device, it is desirable that the bearing device further includes a retainer formed in a cylindrical shape extending along the axial direction, ball pockets for holding the rolling elements to be capable of rolling being provided in the retainer, the inner ring and the outer ring are respectively divided into the one half sections and the other half sections, and the ball pockets are opened in the axial direction.

According to the present invention, the inner ring and the outer ring respectively include the one half sections and the other half sections. Therefore, when the roller bearing is assembled, it is possible to dispose the rolling elements after the one half sections are disposed and before the other half sections are disposed. It is possible to easily dispose the rolling elements between the inner ring and the outer ring. In this case, since the rolling elements can be disposed in a state in which the rolling elements are held by the retainer, the assembly of the bearing device is easily automated. Therefore, it is possible to improve manufacturing efficiency. It is possible to realize the bearing device that can be reduced in cost.

Moreover, since the retainer is formed in the cylindrical shape, it is possible to realize a state in which the retainer is not in contact with the inner ring and the outer ring. Therefore, it is possible to reduce sliding resistance between the retainer and the inner and outer rings. It is possible to realize the bearing device having low torque.

In the bearing device, it is desirable that the inner ring and the outer ring respectively include contact surfaces provided to be capable of coming into contact with the rolling elements, and the contact surfaces are formed in a linear shape in a sectional view passing the center axis.

According to the present invention, it is possible to facilitate cutting of the contact surfaces. Therefore, it is possible to reduce the cost of the bearing device. Since the rolling elements can be set in point-contact with the outer ring and the inner ring, it is possible to realize the bearing device having low torque.

In the bearing device, it is desirable that the inner ring and the outer ring respectively include contact surfaces provided to be capable of coming into contact with the rolling elements, and the contact surfaces are formed in an arcuate shape in a sectional view passing the center axis.

According to the present invention, it is possible to facilitate finishing (grinding) of the contact surfaces. Therefore, it is possible to reduce the cost of the bearing device. It is possible to reduce friction between the contact surfaces and the rolling elements to reduce the torque of the bearing device and suppress fluctuation in rotation torque.

In the bearing device, a contact angle of the rolling elements and the outer and inner rings with respect to the radial direction is larger than 0° and smaller than 45° in a sectional view passing the center axis.

According to the present invention, it is possible to increase force in the axial direction that the rolling elements receive from the outer ring and the inner ring compared with a configuration in which the contact angle is equal to or larger than 45°. Therefore, it is possible to set the rolling elements and the outer and inner rings more strongly in the axial direction Therefore, it is possible to further increase the rigidity in the axial direction of the roller bearing. Therefore, it is possible to increase a resonant frequency of the bearing device. It is possible to realize the bearing device adaptable to high-speed rotation.

In the bearing device, it is desirable that the roller bearing includes seal members configured to cover a space between the inner ring and the outer ring from an outer side in the axial direction, one member of the inner ring and the outer ring is provided to further project in the axial direction than the other member, and the seal members are provided to be in contact with end portions in the axial direction of the one member and overlap the other member when viewed from the axial direction.

According to the present invention, the roller bearing includes the seal members configured to cover the space between the inner ring and the outer ring from the outer side in the axial direction. Therefore, it is possible to suppress foreign matters or the like from entering between the inner ring and the outer ring to deteriorate rotation performance of the roller bearing. It is possible to suppress, with the seal members, scattering of grease and emission of outgas to the outside of the bearing device.

The seal members are provided in contact with the end portions of the one member projecting in the axial direction of the inner ring and the outer ring. Therefore, it is possible to easily prevent the seal members from coming into contact with the other member of the inner ring and the outer ring. Consequently, when the inner ring and the outer ring relatively rotate, it is possible to prevent occurrence of sliding resistance due to contact of the other member of the inner ring and the outer ring and the seal members. Therefore, it is possible to suppress the rotation performance of the roller bearing from being deteriorated.

In the bearing device, it is desirable that the one member is the outer ring.

According to the present invention, it is possible to set a dimension in the axial direction of the outer ring larger than the inner ring. Consequently, when a member to which the bearing device is attached is externally inserted over the outer ring, since a contact area between the member and the outer ring can be increased, it is possible to stably fix the member. Therefore, it is possible to realize the bearing device adaptable to high-speed rotation.

An information recording and reproducing device of the present invention includes: the bearing device; a housing configured to support one side end portion of the bearing device; a turning member externally fit to the bearing device and configured to turn around the center axis of the shaft; and a slider attached to the turning member and configured to record information in and reproduce the information from a magnetic recording medium.

According to the present invention, since the information recording and reproducing device includes the bearing device, it is possible to reduce the thickness of the information recording and reproducing device.

In the information recording and reproducing device, it is desirable that at least a part of the outer ring and the turning member are integrally formed.

According to the present invention, it is possible to reduce the number of components. Therefore, it is possible to reduce the cost of the information recording and reproducing device.

In the information recording and reproducing device, it is desirable that the roller bearing overlaps the turning member over the entire axial direction.

According to the present invention, it is possible to prevent the roller bearing from projecting in the axial direction from the turning member. Therefore, it is possible to surely reduce the thickness of the information recording and reproducing device.

A manufacturing method for the bearing device of the present invention includes: inserting the outer ring and the one half section over the shaft and fixing the one half section to the shaft; disposing a retainer capable of holding the rolling elements; disposing the rolling elements from the other side of the axial direction; inserting the other half section over the shaft; and fixing the other half section to the shaft while pressing the other half section toward the one half section.

According to the present invention, it is possible to dispose the retainer and the rolling elements after the outer ring and the one half section are disposed and before the other half section is disposed. Therefore, since the bearing device can be easily manufactured, it is possible to reduce manufacturing cost and reduce the cost of the bearing device.

A manufacturing method for the bearing device of the present invention includes: inserting, over the shaft, an externally inserted member externally inserted over the one half section and the other half section of the outer ring, the one half section of the outer ring, and the one half section of the inner ring; fixing the one half section of the outer ring to the externally inserted member, and fixing the one half section of the inner ring to the shaft; causing the retainer to hold the plurality of rolling elements; disposing the rolling elements from the other side in the axial direction together with the retainer; inserting the other half section of the outer ring and the other half section of the inner ring over the shaft; and fixing the other half section of the inner ring to the shaft and fixing the one half section of the outer ring to the externally inserted member while pressing the other half section of at least one member of the inner ring and the outer ring toward the one half section of the one member.

According to the present invention, the rolling elements held by the retainer can be disposed together with the retainer. Therefore, assembly of the bearing device is easily automated. Therefore, since it is possible to improve manufacturing efficiency of the bearing device, it is possible to reduce manufacturing cost and reduce the cost of the bearing device.

According to the present invention, the one half section is in contact with the rolling elements from one side toward the other side in the axial direction, the other half section is in contact with the rolling elements from the other side toward the one side in the axial direction, and the preloads are applied to the one half section and the other half section in directions in which the one half section and the other half section come close to each other. Therefore, the rolling elements can be pressed in the radial direction by the one half section and the other half section. Consequently, it is possible to apply the preloads with one roller bearing. It is possible to eliminate inner gaps between the inner and outer rings and the rolling elements and increase the rigidity of the roller bearing. Therefore, it is possible to reduce the thickness of the bearing device compared with a configuration in which a pair of roller bearings is used as in the related art.

DETAILED DESCRIPTION OF THE INVENTION

Embodiments of the present invention are explained below with reference to the drawings.

First Embodiment

First, an information recording and reproducing device 1 and a bearing device 10 in a first embodiment are explained.
Information recording and reproducing device
FIG. 1 is a perspective view of the information recording and reproducing device according to the first embodiment.

Figure 1:
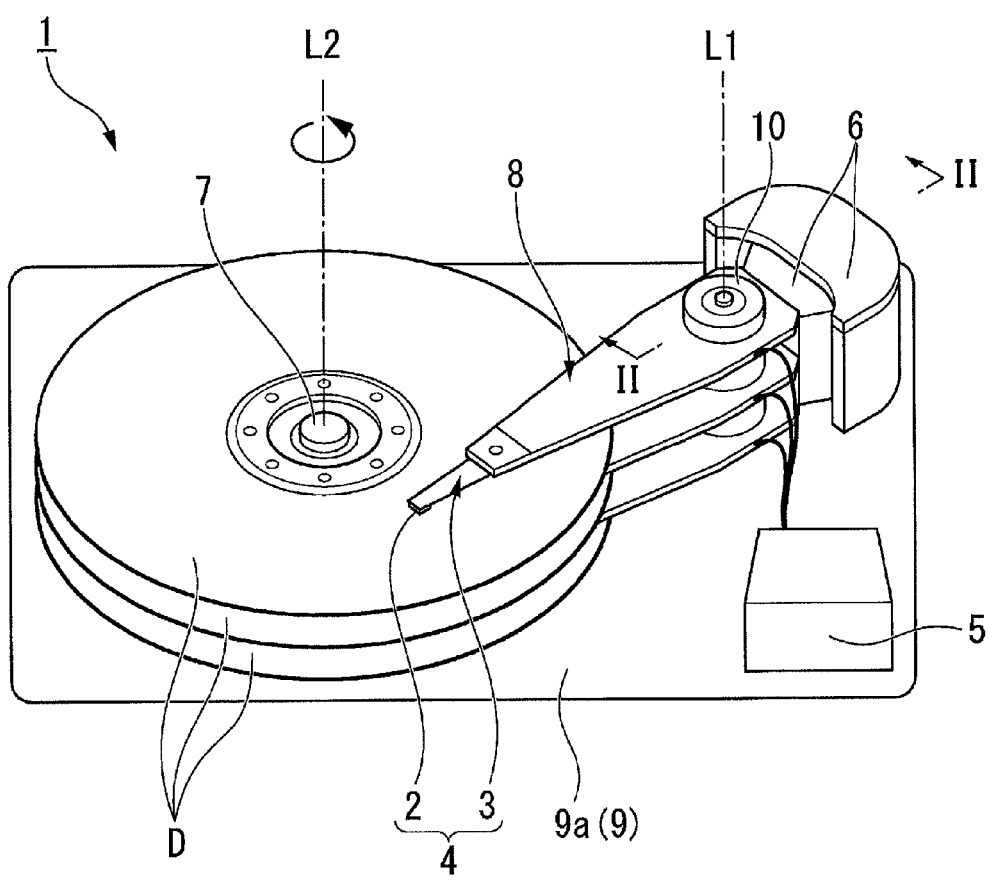
FIG. 1 is a perspective view of an information recording and reproducing device according to a first embodiment.

As shown in FIG. 1, the information recording and reproducing device 1 is a device that performs writing and reading on a disk D (a magnetic recording medium) including a recording layer. The information recording and reproducing device 1 includes an arm 8 (a turning member), a head gimbal assembly 4 supported on the distal end side of the arm 8, a slider 2 attached to the distal end of the head gimbal assembly 4, an actuator (VCM: voice coil motor) 6 that moves the head gimbal assembly 4 for scanning, a spindle motor 7 that rotates the disk D, a control unit 5 that supplies an electric current modulated according to information to the slider 2, and a housing 9 that houses these components on the inside.

The housing 9 is made of a metal material such as aluminum, iron, or stainless steel and is a box-shaped housing including an opening in an upper part. The housing 9 is configured by a bottom section 9a having a square shape in plan view and a peripheral wall (not shown in the figure) vertically erected from a peripheral edge portion of the bottom section 9a. A housing recessed section that houses the components is formed on the inner side of the housing 9 surrounded by the peripheral wall. The spindle motor 7 is attached to the substantial center of the bottom section 9a. The disk D is detachably fixed by fitting a center hole in the spindle motor 7.

The bearing device 10 is disposed in a side direction of the disk D. One side end portion of the bearing device 10 is supported by the bottom section 9a of the housing 9. The arm 8 is externally fit and fixedly attached to the outer circumferential surface of the bearing device 10. The proximal end portion of the arm 8 is connected to the actuator 6. The arm 8 is extended in parallel to the surface of the disk D from the proximal end side toward the distal end side.

The head gimbal assembly 4 is connected to the distal end of the arm 8. The head gimbal assembly 4 includes a suspension 3 and the slider 2 attached to the distal end of the suspension 3 and disposed to be opposed to the surface of the disk D. The slider 2 includes a recording element that performs writing (recording) of information in the disk D and a reproducing element that performs reading (reproduction) of information from the disk D.

In the information recording and reproducing device 1 configured as explained above, to perform recording or reproduction of information, first, the spindle motor 7 is driven to rotate the disk D around a center axis L2 of the disk D. The actuator 6 is driven to turn the arm 8 with the bearing device 10 set as a turning center. Consequently, the slider 2 disposed at the distal end of the head gimbal assembly 4 can be moved to scan sections on the surface of the disk D. Recording or reproduction of information on the disk D can be performed by driving the recording element or the reproducing element of the slider 2.
Bearing Device FIG. 2 is a side sectional view taken along a line II-II in FIG. 1.

Figure 2:
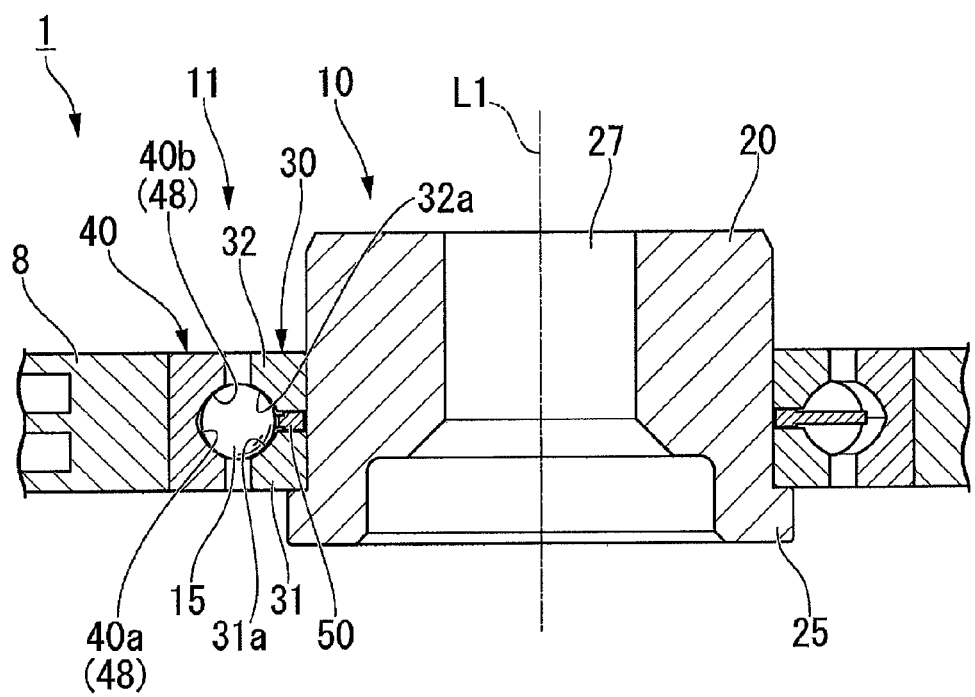
FIG. 2 is a side sectional view taken along a line II-II in FIG. 1.

As shown in FIG. 2, the bearing device 10 includes a shaft 20 and a roller bearing 11 externally inserted over the shaft 20.

Note that, in the following explanation, a direction along the center axis (a center axis of the shaft 20) L1 of the bearing device 10 is referred to as "axial direction". A direction orthogonal to the center axis L1 is referred to as "radial direction". A direction around the center axis L1 is referred to as "circumferential direction".

The shaft 20 is formed of a metal material such as aluminum or stainless steel in a columnar shape and connected to the housing 9 (see FIG. 1). A flange 25 is formed on the axial direction one side of the shaft 20. In the shaft 20, a recessed section 27 opened on the axial direction both end faces of the shaft 20 is formed. The recessed section 27 pierces through the shaft 20 in the axial direction. The recessed section 27 is disposed coaxially with the center axis L1. The recessed section 27 is expanded in diameter on one side (a side on which the flange 25 is formed) in the axial direction of the shaft 20.

The roller bearing 11 includes an inner ring 30 disposed coaxially with the center axis L1, an outer ring 40 surrounding the inner ring 30 from the outer side in the radial direction, a plurality of (in this embodiment, nine) rolling elements 15 formed in a spherical shape and held between the inner ring 30 and the outer ring 40 to be capable of rolling, and a retainer 50 that holds the rolling elements 15 to be capable of rolling. A dimension in the axial direction of the roller bearing 11 is equivalent to the dimension of the arm 8. The roller bearing 11 overlaps the arm 8 in the entire axial direction.

The inner ring 30 is formed of a metal member in an annular shape and externally inserted over the shaft 20. The inner ring 30 is divided into an inner ring one half section 31 (one half section) disposed on one side (the flange 25 side of the shaft 20) in the axial direction and an inner ring other half section 32 (the other half section) disposed on the other side in the axial direction.

The inner ring one half section 31 is formed in an annular shape extending along the axial direction. The axial direction both end faces of the inner ring one half section 31 are formed in a plane shape extending along the radial direction. At the end portion on the inner ring other half section 32 side (the other side) in the axial direction in the outer circumferential surface of the inner ring one half section 31, a one half section rolling surface 31a (a contact surface) gradually reduced in diameter from the axial direction one side toward the other side is formed over the entire circumference. The one half section rolling surface 31a is formed in an arcuate shape in a sectional view passing the center axis L1 (hereinafter referred to as "longitudinal sectional view") and directed to the radial direction outer side and the axial direction other side. A curvature radius of the one half section rolling surface 31a is larger than the radius of the rolling element 15. The rolling element 15 is capable of coming into contact with the one half section rolling surface 31a. The inner ring one half section 31 is in contact with the flange 25 of the shaft 20 from the axial direction other side.

The inner ring other half section 32 is formed surface-symmetrically to the inner ring one half section 31 with respect to a surface orthogonal to the center axis L1. That is, at the end portion on the inner ring one half section 31 side (one side) in the axial direction in the outer circumferential surface of the inner ring other half section 32, an other half section rolling surface 32a (a contact surface) gradually reduced in diameter from the axial direction other side toward the one side is formed over the entire circumference. The other half section rolling surface 32a is formed in an arcuate shape in the longitudinal sectional view and directed to the radial direction outer side and the axial direction one side. The rolling element 15 is capable of coming into contact with the other half section rolling surface 32a. The inner ring other half section 32 is disposed to be separated from the inner ring one half section 31 in the axial direction.

The outer ring 40 is formed of a metal material in a cylindrical shape extending along the axial direction. A dimension in the axial direction of the outer ring 40 is equivalent to the dimension of the inner ring 30. In the center in the axial direction in the inner circumferential surface of the outer ring 40, a rolling groove 48 is formed over the entire circumference along the circumferential direction. In the rolling groove 48, a first rolling surface 40a (a contact surface) provided on the axial direction one side and a second rolling surface 40b (a contact surface) provided on the axial direction other side are provided. The first rolling surface 40a is formed in an arcuate shape in the longitudinal sectional view gradually expanded in diameter from the axial direction one side toward the other side. The first rolling surface 40a is directed to the radial direction inner side and the axial direction other side. A curvature radius of the first rolling surface 40a is larger than the radius of the rolling element 15. The second rolling surface 40b is formed surface-symmetrically to the first rolling surface 40a with respect to the surface orthogonal to the center axis L1. The second rolling surface 40b is directed to the radial direction inner side and the axial direction one side. The rolling element 15 is capable of coming into contact with the first rolling surface 40a and the second rolling surface 40b.

The rolling element 15 is formed of a metal material. The rolling element 15 is in contact with the one half section rolling surface 31a, the other half section rolling surface 32a, and the first rolling surface 40a and the second rolling surface 40b of the rolling groove 48 and configured to roll along the circumferential direction between the inner ring 30 and the outer ring 40. The one half section rolling surface 31a of the inner ring one half section 31 is in contact with, from the axial direction one side toward the axial direction other side, a portion of the rolling element 15 facing the radial direction inner side. The other half section rolling surface 32a of the inner ring other half section 32 is in contact with, from the axial direction other side toward the axial direction one side, the portion of the rolling element 15 facing the radial direction inner side. Further, the first rolling surface 40a of the outer ring 40 is in contact with, from the axial direction one side toward the axial direction other side, the portion of the rolling element 15 facing the radial direction outer side. The second rolling surface 40b of the outer ring 40 is in contact with, from the axial direction other side toward the axial direction one side, the portion of the rolling element 15 facing the radial direction outer side.

Figure 3:
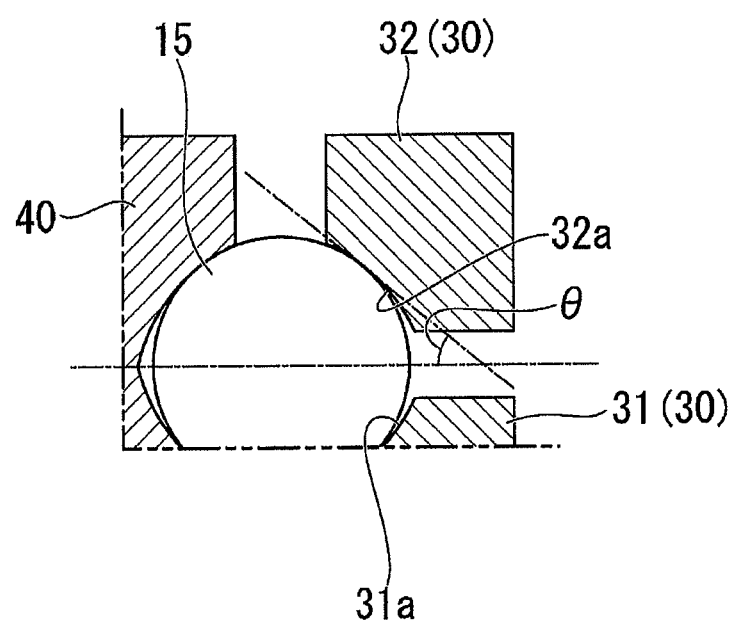
FIG. 3 is an enlarged sectional view of a main part of a bearing device according to the first embodiment.

FIG. 3 is an enlarged sectional view of a main part of the bearing device according to the first embodiment.

The rolling element 15 is in contact with the one half section rolling surface 31a and the first rolling surface 40a in the same position in the axial direction. The rolling element 15 is in contact with the other half section rolling surface 32a and the second rolling surface 40b in the same position in the axial direction. In the longitudinal sectional view, a contact angle $\theta$ of the rolling element 15 and the other half section rolling surface 32a with respect to the radial direction is smaller than 45° (see FIG. 3). The same applies to a contact angle of the rolling element 15 and the one half section rolling surface 31a and a contact angle of the first rolling surface 40a and the second rolling surface 40b. The plurality of rolling elements 15 are annularly uniformly arrayed along the circumferential direction to be capable of rolling by the retainer 50.

Figure 4:
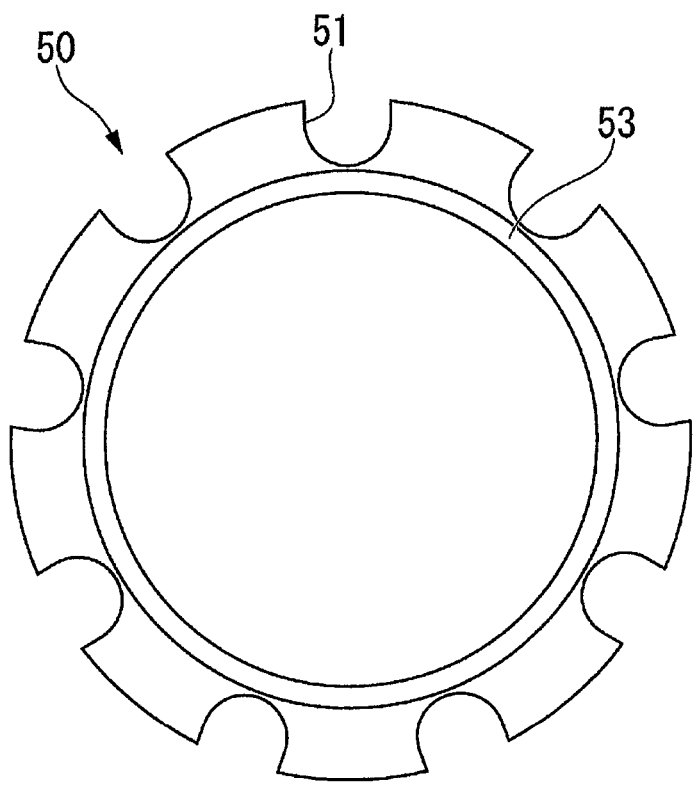
FIG. 4 is a plan view of a retainer according to the first embodiment.

FIG. 4 is a plan view of the retainer according to the first embodiment.

As shown in FIGS. 2 and 4, the retainer 50 is formed of a resin material or the like in an annular plate shape and disposed coaxially with the center axis L1. The inner diameter of the retainer 50 is slightly larger than the outer diameter of the shaft 20. The outer diameter of the retainer 50 is approximately the inner diameter of the outer ring 40. In the retainer 50, ball pockets 51, into which the rolling elements 15 can be inserted, are formed according to the number of rolling elements 15. The ball pockets 51 are recessed from the outer circumferential surface of the retainer 50 toward the radial direction inner side. The ball pockets 51 are formed at equal intervals in the circumferential direction. At the inner circumferential edge of the retainer 50, a thick section 53 projecting to the axial direction both sides is continuously formed over the entire circumference along the circumferential direction. The thick section 53 is formed further on the radial direction inner side than the ball pockets 51. The thickness of the thick section 53 is smaller than a gap between the inner ring one half section 31 and the inner ring other half section 32. The retainer 50 is disposed such that the thick section 53 is located between the inner ring one half section 31 and the inner ring other half section 32. Note that the thick section 53 may be discontinuously formed along the circumferential direction.

As shown in FIG. 2, the inner ring one half section 31 and the inner ring other half section 32 are fixed to the shaft 20 by press-fitting, bonding, welding, or the like. In this case, preloads are applied to the inner ring one half section 31 and the inner ring other half section 32 in directions in which the inner ring one half section 31 and the inner ring other half section 32 come close to each other. Specifically, the inner ring other half section 32 is fixed to the shaft 20 in a state in which the inner ring other half section 32 is pressed toward the inner ring one half section 31 side. The inner ring other half section 32 is pressed, whereby the inner ring one half section 31 is pressed toward the flange 25 side via the rolling element 15. Since the inner ring one half section 31 is in contact with the flange 25 from the axial direction other side, movement to the axial direction one side is regulated. Consequently, preloads are applied to the inner ring one half section 31 and the inner ring other half section 32 in directions in which the inner ring one half section 31 and the inner ring other half section 32 come close to each other.

A manufacturing method for the bearing device 10 according to this embodiment is explained.

Figure 5:
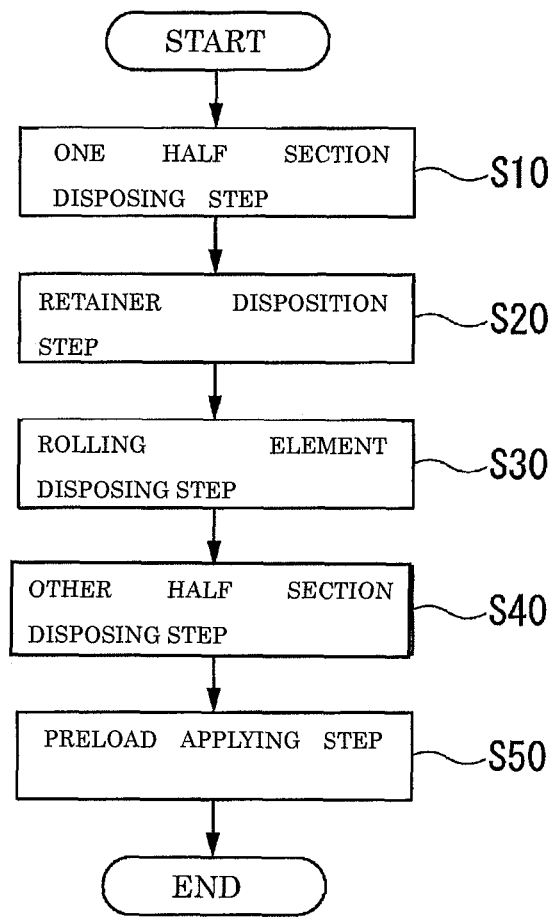
FIG. 5 is a flowchart for explaining a manufacturing method for the bearing device according to the first embodiment.

FIG. 5 is a flowchart for explaining the manufacturing method for the bearing device according to the first embodiment. FIGS. 6 to 9 are process drawings showing the manufacturing method for the bearing device according to the first embodiment and are sectional views in a portion corresponding to the line II-II in FIG. 1.

As shown in FIG. 5, the manufacturing method for the bearing device 10 according to this embodiment includes a one half section disposing step S10, a retainer disposing step S20, a rolling element disposing step S30, an other half section disposing step S40, and a preload applying step S50.

Figure 6:
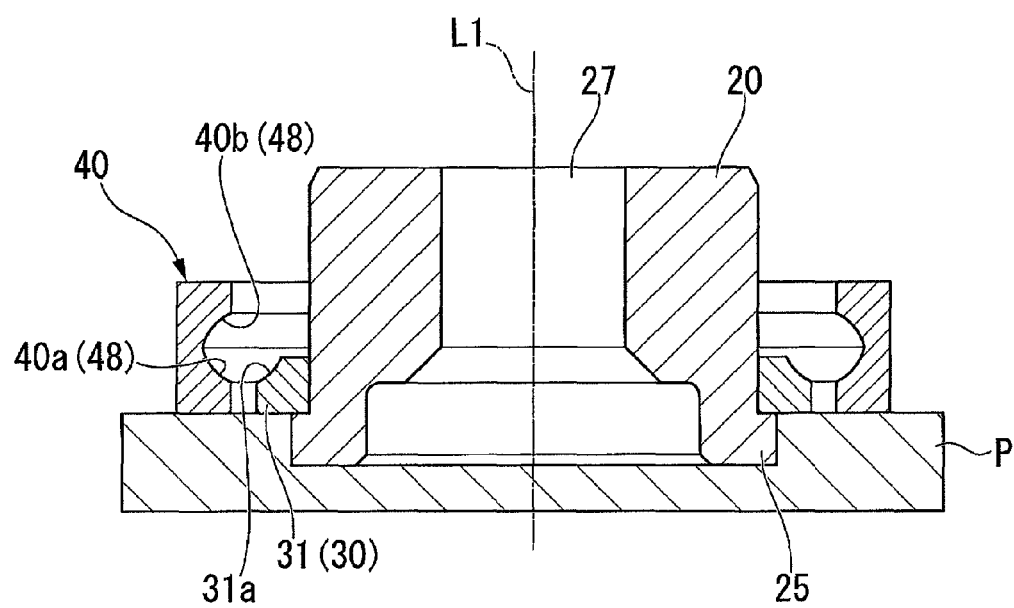
FIG. 6 is a process drawing showing the manufacturing method for the bearing device according to the first embodiment and is a sectional view in a portion corresponding to the line II-II in FIG. 1.

First, the one half section disposing step S10 is performed. As shown in FIG. 6, in the one half section disposing step S10, the outer ring 40 and the inner ring one half section 31 of the inner ring 30 are inserted over the shaft 20. The inner ring one half section 31 is fixed to the shaft 20.

Specifically, first, the shaft 20 is placed on a block-like jig P. In the jig P, a recessed section corresponding to the flange 25 of the shaft 20 is formed. The shaft 20 is placed such that a surface facing the axial direction other side of the flange 25 is flush with the principal plane of the jig P. Subsequently, the inner ring one half section 31 is externally inserted over the shaft 20 and fixed to the shaft 20 in a state in which the inner ring one half section 31 is set in contact with the flange 25. The fixing of the inner ring one half section 31 and the shaft 20 is performed by press-fitting, bonding, welding, and the like. The outer ring 40 is externally inserted over the shaft 20 and placed on the principal plane of the jig P. Consequently, the end face on the axial direction one side of the inner ring one half section 31 and the end face on the axial direction one side of the outer ring 40 are located in the same position in the axial direction. Note that the shape of the jig P is not limited to the form shown in the figure and may be changed as appropriate.

Figure 7:
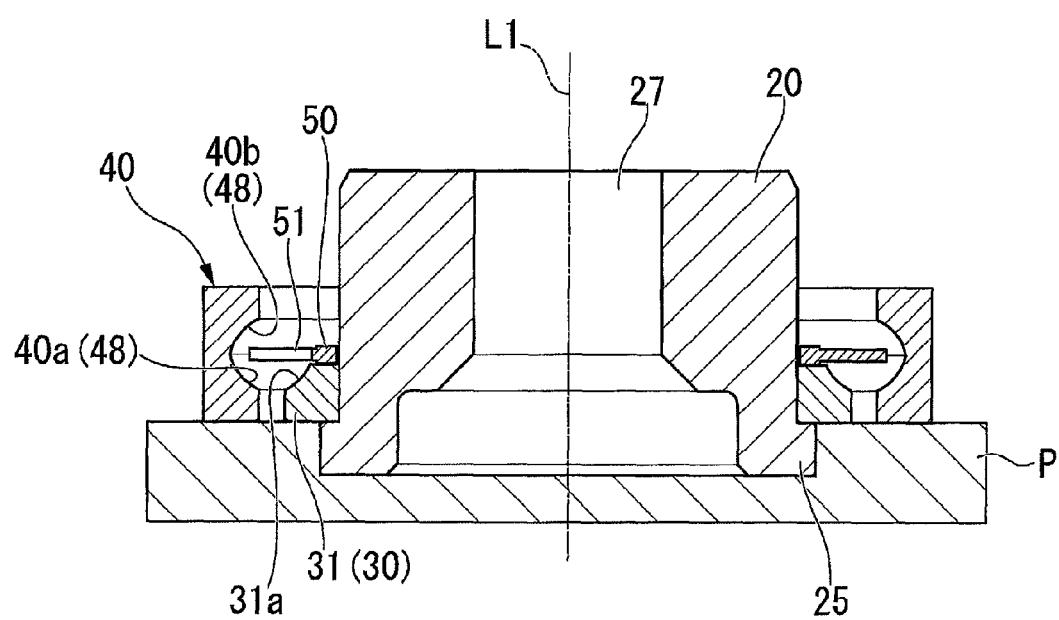
FIG. 7 is a process drawing showing the manufacturing method for the bearing device according to the first embodiment and is a sectional view in the portion corresponding to the line II-II in FIG. 1.

Subsequently, the retainer disposing step S20 is performed. As shown in FIG. 7, in the retainer disposing step S20, the retainer 50 is disposed.

Specifically, the retainer 50 is externally inserted over the shaft 20 and placed on the end face on the axial direction other side of the inner ring one half section 31.

Figure 8:
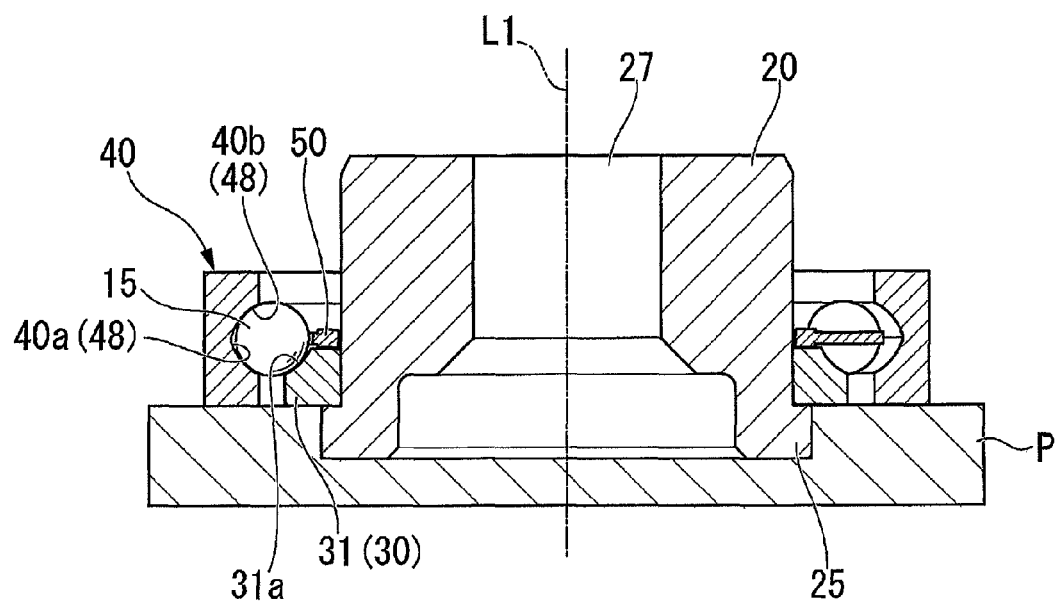
FIG. 8 is a process drawing showing the manufacturing method for the bearing device according to the first embodiment and is a sectional view in the portion corresponding to the line II-II in FIG. 1.

Subsequently, the rolling element disposing step S30 is performed. As shown in FIG. 8, in the rolling element disposing step S30, the rolling element 15 is disposed from the other side in the axial direction.

Specifically, the plurality of rolling elements 15 are respectively inserted between the outer ring 40 and the shaft 20 from the other side in the axial direction. Further, the rolling elements 15 are pushed in toward the ball pockets 51 (see FIG. 7) of the retainer 50. Consequently, the rolling elements 15 are disposed between the one half section rolling surface 31a of the inner ring one half section 31 and the rolling groove 48 in a state in which the rolling elements 15 are held by the retainer 50.

Figure 9:
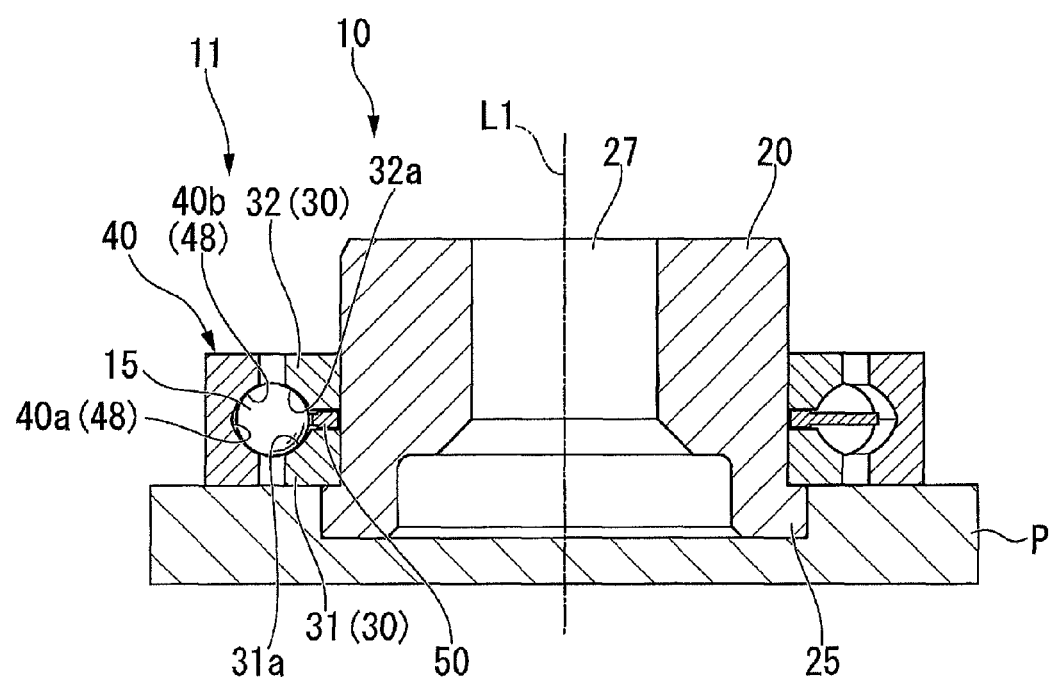
FIG. 9 is a process drawing showing the manufacturing method for the bearing device according to the first embodiment and is a sectional view in the portion corresponding to the line II-II in FIG. 1.

Subsequently, the other half section disposing step S40 is performed. As shown in FIG. 9, in the other half section disposing step S40, the inner ring other half section 32 of the inner ring 30 is inserted into the shaft 20.

Specifically, the inner ring other half section 32 is externally inserted over the shaft 20 to set the other half section rolling surface 32a in contact with the rolling element 15. Consequently, the rolling element 15 is disposed among the one half section rolling surface 31a, the other half section rolling surface 32a, and the rolling groove 48.

Subsequently, the preload applying step S50 is performed. In the preload applying step S50, the inner ring other half section 32 is fixed to the shaft 20 while being pressed toward the inner ring one half section 31.

Specifically, the inner ring other half section 32 is fixed to the shaft 20 in a state in which the inner ring other half section 32 is pressed with a predetermined force toward the inner ring one half section 31 side. The fixing of the inner ring other half section 32 and the shaft 20 is performed by press-fitting, bonding, welding, or the like. Force applied to the inner ring other half section 32 via the rolling element 15 reaches the inner ring one half section 31 fixed to the shaft 20. Consequently, preloads are applied to the inner ring one half section 31 and the inner ring other half section 32 in directions in which the inner ring one half section 31 and the inner ring other half section 32 come close to each other. The one half section rolling surface 31a is directed to the radial direction outer side and the axial direction other side and is in contact with the rolling element 15 from the axial direction one side toward the axial direction other side. The other half section rolling surface 32a is directed to the radial direction outer side and the axial direction one side and is in contact with the rolling element 15 from the axial direction other side toward the axial direction one side. Therefore, since preloads are applied to the inner ring one half section 31 and the inner ring other half section 32 in directions in which the inner ring one half section 31 and the inner ring other half section 32 come close to each other, the rolling element 15 is pressed toward the radial direction outer side. As a result, the rolling element 15 presses the rolling groove 48 of the outer ring 40 and eliminates inner gaps between the inner and outer rings 30 and 40 and the rolling element 15.

Finally, the jig P is detached, whereby the bearing device 10 shown in FIG. 2 is completed.

In this way, according to this embodiment, the inner ring one half section 31 is in contact with the rolling element 15 from the one side toward the other side in the axial direction. The inner ring other half section 32 is in contact with the rolling element 15 from the other side toward the one side in the axial direction. The preloads are applied to the inner ring one half section 31 and the inner ring other half section 32 in the directions in which the inner ring one half section 31 and the inner ring other half section 32 come close to each other. Therefore, the rolling element 15 can be pressed in the radial direction by the inner ring one half section 31 and the inner ring other half section 32. Consequently, it is possible to apply the preloads with one roller bearing 11. It is possible to eliminate inner gaps between the inner and outer rings 30 and 40 and the rolling element 15 and increase the rigidity of the bearing 11. Therefore, compared with a configuration in which a pair of roller bearings is used as in the related art, it is possible to reduce the thickness of the bearing device 10. It is possible to reduce the thickness of the information recording and reproducing device 1.

The inner ring 30 is divided into the inner ring one half section 31 and the inner ring other half section 32. Therefore, it is possible to realize a so-called inner-ring-preloaded bearing device 10, to the inner ring of which a preload is applied. Consequently, it is possible to further increase the rigidity of the roller bearing 11. Therefore, it is possible to increase a resonant frequency of the bearing device 10. It is possible to realize the bearing device 10 adaptable to high-speed rotation.

The inner circumferential edge (the thick section 53) of the retainer 50 projects in the axial direction and is disposed between the inner ring one half section 31 and the inner ring other half section 32. Therefore, a contact part of the retainer 50 and the inner ring 30 can be limited to only the thick section 53 at the inner circumferential edge of the retainer 50 projecting in the axial direction. Consequently, compared with a configuration in which the retainer is in contact with the inner ring in a region other than the inner circumferential edge, it is possible to reduce a sliding area of the retainer 50 and the inner ring 30 at the time when the retainer 50 rotates with respect to the inner ring 30. It is possible to set the retainer 50 and the inner ring 30 in contact in a position at a shorter distance to a rotation center. Therefore, it is possible to reduce sliding resistance between the retainer 50 and the inner ring 30 and suppress a loss of rotation torque. It is possible to realize the bearing device 10 having low torque.

Since the rolling surfaces 31a, 32a, 40a, and 40b are formed in the arcuate shape in the longitudinal sectional view, it is possible to facilitate finishing (grinding) of the rolling surfaces 31a, 32a, 40a, and 40b. Therefore, it is possible to reduce the cost of the bearing device 10. It is possible to reduce friction between the rolling surfaces 31a, 32a, 40a, and 40b and the rolling element 15 to reduce the torque of the bearing device 10 and suppress fluctuation in rotation torque.

In this embodiment, the contact angle of the rolling element 15 and the inner and outer rings 30 and 40 with respect to the radial direction is larger than 0° and smaller than 45° in the longitudinal sectional view.

Consequently, it is possible to increase force in the axial direction that the rolling element 15 receives from the inner ring 30 and the outer ring 40 compared with a configuration in which the contact angle is equal to or larger than 45°. Therefore, it is possible to set the rolling element 15 and the inner and outer rings 30 and 40 in contact more strongly in the axial direction. Therefore, it is possible to further increase the rigidity in the axial direction of the roller bearing 11. Therefore, it is possible to increase a resonant frequency of the bearing device 10. It is possible to realize the bearing device 10 adaptable to high-speed rotation.

In the information recording and reproducing device 1 according to this embodiment, the roller bearing 11 overlaps the arm 8 over the entire axial direction. Therefore, it is possible to prevent the roller bearing 11 from projecting in the axial direction from the arm 8. Therefore, it is possible to surely reduce the thickness of the information recording and reproducing device 1.

With the manufacturing method for the bearing device 10 according to this embodiment, the retainer 50 and the rolling element 15 can be disposed in the retainer disposing step S20 and the rolling element disposing step S30 after the outer ring 40 and the inner ring one half section 31 are disposed in the one half section disposing step S10 and before the inner ring other half section 32 is disposed in the other half section disposing step S40. Therefore, since the bearing device 10 can be easily manufactured, it is possible to reduce manufacturing cost and reduce the cost of the bearing device 10.

A first modification of the first embodiment is explained. Note that components same as the components in the first embodiment shown in FIG. 2 are denoted by the same reference numerals and signs and detailed explanation of the components is omitted (the same applies to another modification explained below).

Figure 10:
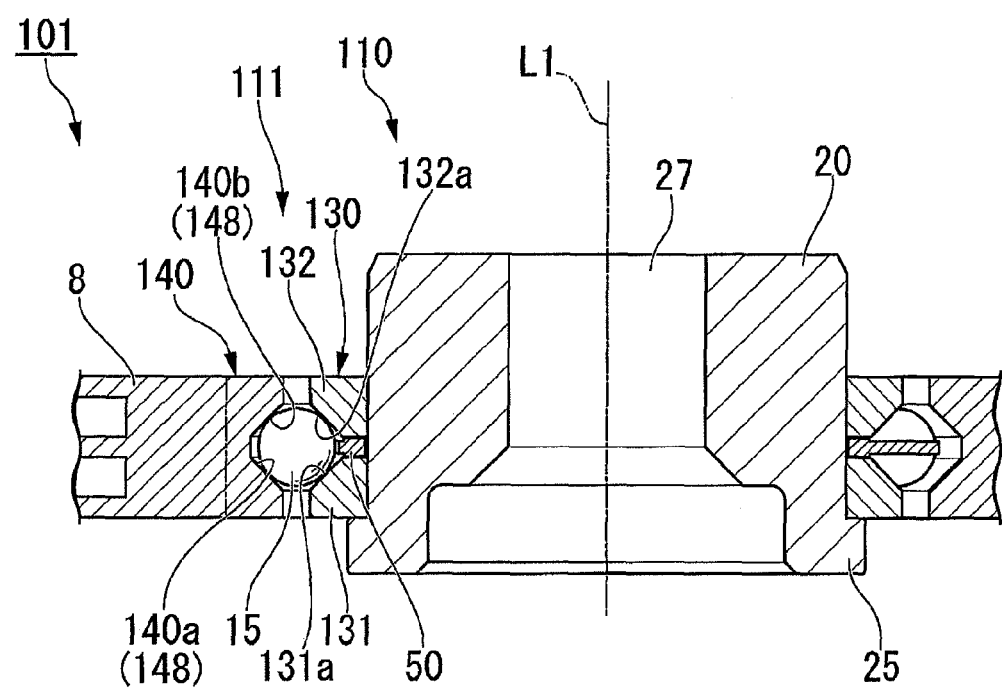
FIG. 10 is an explanatory diagram of a bearing device according to a first modification of the first embodiment and is a sectional view in a portion corresponding to the line II-II in FIG. 1.

FIG. 10 is an explanatory diagram of a bearing device according to the first modification of the first embodiment and is a sectional view in a portion corresponding to the line II-II in FIG. 1.

In the information recording and reproducing device 1 according to the first embodiment, the outer ring 40 and the arm 8 are formed as separate bodies. However, the present invention is not limited to this.

As shown in FIG. 10, in an information recording and reproducing device 101 according to the first modification of the first embodiment, a roller bearing 111 of a bearing device 110 includes an outer ring 140 formed integrally with the arm 8.

With this configuration, since an outer ring 140 and the arm 8 are integrally formed, it is possible to reduce the number of components. It is possible to reduce the cost of the information recording and reproducing device 101.

In the first embodiment, the rolling surfaces 31a, 32a, 40a, and 40b are formed in the arcuate shape in the longitudinal sectional view. However, the present invention is not limited to this.

As shown in FIG. 10, an inner ring 130 of the roller bearing 111 is divided into an inner ring one half section 131 (one half section) disposed on one side (the flange 25 side of the shaft 20) in the axial direction and an inner ring other half section 132 (the other half section) disposed on the other side in the axial direction.

The inner ring one half section 131 is formed in an annular shape extending along the axial direction. At the end portion on the inner ring other half section 132 side (the other side) in the axial direction in the outer circumferential surface of the inner ring one half section 131, a one half section rolling surface 131a (a contact surface) gradually reduced in diameter from the axial direction one side toward the other side is formed over the entire circumference. The one half section rolling surface 131a is formed in a linear shape in the longitudinal sectional view and directed to the radial direction outer side and the axial direction other side.

The inner ring other half section 132 is formed surface-symmetrically to the inner ring one half section 131 with respect to the surface orthogonal to the center axis L1. That is, at the end portion on the inner ring one half section 131 side in the axial direction in the outer circumferential surface of the inner ring other half section 132, an other half section rolling surface 132a (a contact surface) having a linear shape in the longitudinal sectional view is formed over the entire circumference. The other half section rolling surface 132a is directed to the radial direction outer side and the axial direction one side.

In the center in the axial direction in the inner circumferential surface of the outer ring 140, a rolling groove 148 is formed over the entire circumference along the circumferential direction. In the rolling groove 148, a first rolling surface 140a (a contact surface) provided on the axial direction one side and a second rolling surface 140b (a contact surface) provided on the axial direction other side are provided. The first rolling surface 140a is gradually expanded in diameter from the axial direction one side toward the other side and formed in a linear shape in the longitudinal sectional view. The first rolling surface 140a is directed to the radial direction inner side and the axial direction other side. The second rolling surface 140b is formed surface-symmetrical to the first rolling surface 140a with respect to the surface orthogonal to the center axis L1. The second rolling surface 140b is directed to the radial direction inner side and the axial direction one side.

The rolling element 15 is in contact with the one half section rolling surface 131a, the other half section rolling surface 132a, and the first rolling surface 140a and the second rolling surface 140b of the rolling groove 148 and configured to roll along the circumferential direction between the inner ring 130 and the outer ring 140. The rolling element 15 is in contact with the one half section rolling surface 131a and the first rolling surface 140a in the same position in the axial direction. The rolling element 15 is in contact with the other half section half section rolling surfaced 132a and the second rolling surface 140b in the same position in the axial direction.

With this configuration, since the rolling surfaces 131a, 132a, 140a, and 140b are formed in the linear shape in the longitudinal sectional view, it is possible to facilitate cutting of the rolling surfaces 131a, 132a, 140a, and 140b. Therefore, it is possible to reduce the cost of the bearing device 110. Since the rolling element 15 can be set in point-contact with the outer ring 140 and the inner ring 130, it is possible to realize the bearing device 110 having low torque.

A second modification of the first embodiment is explained.

In the first embodiment, the inner ring 30 and the shaft 20 are formed as separate bodies. However, the present invention is not limited to this.

Figure 11:
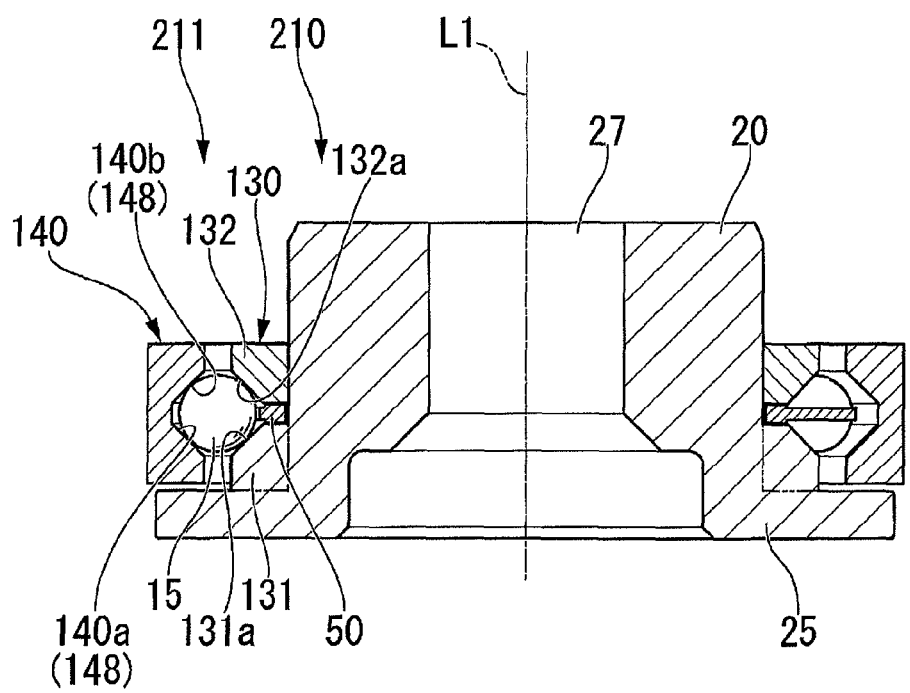
FIG. 11 is an explanatory diagram of a bearing device according to a second modification of the first embodiment and is a sectional view in a portion corresponding to the line II-II in FIG. 1.

FIG. 11 is an explanatory diagram of a bearing device according to the second modification of the first embodiment and is a sectional view in a portion corresponding to the line II-II in FIG. 1.

As shown in FIG. 11, a roller bearing 211 of a bearing device 210 according to the second modification of the first embodiment includes the inner ring one half section 131 formed integrally with the shaft 20.

With this configuration, apart (the inner ring one half section 131) of the inner ring 130 is formed integrally with the shaft 20. Therefore, it is possible to reduce the number of components. It is possible to reduce the cost of the bearing device 210.

Second Embodiment

A bearing device 310 according to a second embodiment is explained.

Figure 12:
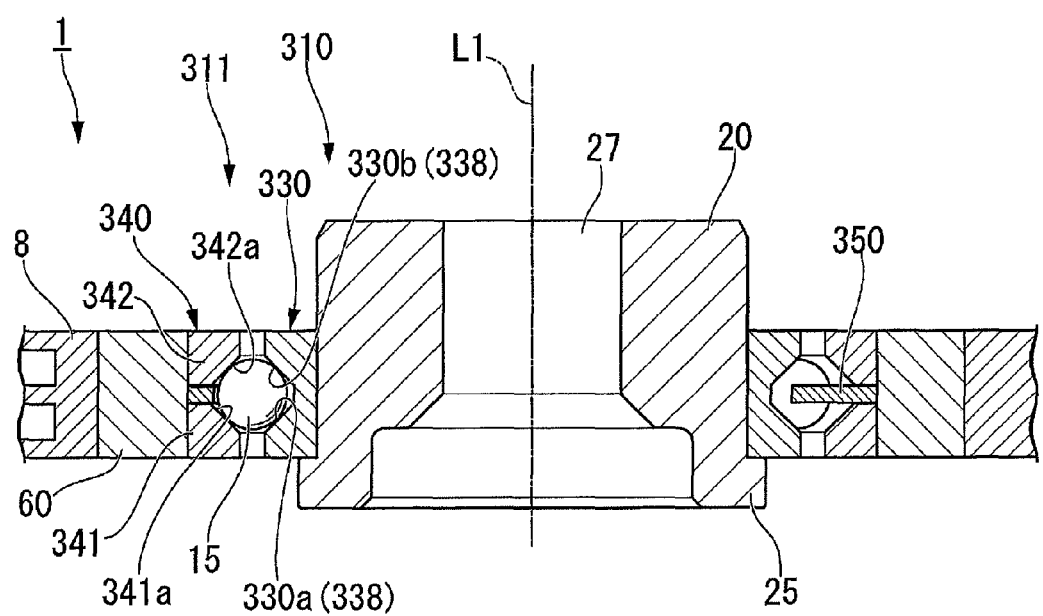
FIG. 12 is an explanatory diagram of a bearing device according to a second embodiment and is a sectional view in a portion corresponding to the line II-II in FIG. 1.

FIG. 12 is an explanatory diagram of the bearing device according to the second embodiment and is a sectional view in a portion corresponding to the line II-II in FIG. 1.

In the first embodiment shown in FIG. 1, the inner ring 30 is divided in the axial direction and the outer ring 40 is integrally formed. The second embodiment shown in FIG. 12 is different from the first embodiment in that an inner ring 330 is integrally formed and an outer ring 340 is divided in the axial direction. Note that components same as the components in the first embodiment and the modifications of the first embodiment are denoted by the same reference numerals and signs and detailed explanation of the components is omitted (the same applies to embodiments and modifications explained below).

As shown in FIG. 12, a roller bearing 311 includes the inner ring 330, the outer ring 340, the rolling element 15, a retainer 350, and a sleeve 60 (an externally inserted member).

The inner ring 330 is formed of a metal material in a cylindrical shape extending along the axial direction. The inner ring 330 is externally inserted over the shaft 20 and fixed to the shaft 20 by press-fitting, bonding, welding, or the like. In the center in the axial direction in the outer circumferential surface of the inner ring 330, a rolling grove 338 is formed over the entire circumference along the circumferential direction. In the rolling groove 338, a first rolling surface 330a (a contact surface) provided on the axial direction one side and a second rolling surface 330b (a contact surface) provided on the axial direction other side are provided. The first rolling surface 330a is gradually reduced in diameter from the axial direction one side toward the other side and formed in a linear shape in the longitudinal sectional view. The first rolling surface 330a is directed to the radial direction outer side and the axial direction other side. The second rolling surface 330b is formed surface-symmetrically to the first rolling surface 330a with respect to the surface orthogonal to the center axis L1. The second rolling surface 330b is directed to the radial direction outer side and the axial direction one side. The inner ring 330 is in contact with the flange 25 of the shaft 20 from the axial direction other side.

The outer ring 340 is formed of a metal material. The outer ring 340 is divided into an outer ring one half section 341 (one half section) disposed on one side in the axial direction and an outer ring other half section 342 (the other half section) disposed on the other side in the axial direction.

The outer ring one half section 341 is formed in an annular shape extending along the axial direction. The axial direction both end faces of the outer ring one half section 341 are formed in a plane shape extending along the radial direction. At the end portion on the outer ring other half section 342 side (the other side) in the axial direction in the inner circumferential surface of the outer ring one half section 341, a one half section rolling surface 341a (a contact surface) gradually expanded in diameter from the axial direction one side toward the other side is formed over the entire circumference. The one half section rolling surface 341a is formed in a linear shape in the longitudinal sectional view and directed to the radial direction inner side and the axial direction other side.

The outer ring other half section 342 is formed surface-symmetrically to the outer ring one half section 341 with respect to the surface orthogonal to the center axis L1. That is, at the end portion on the outer ring one half section 341 side in the axial direction in the inner circumferential surface of the outer ring other half section 342, an other half section rolling surface 342a (a contact surface) gradually expanded in diameter from the axial direction other side toward the one side is formed over the entire circumference. The other half section rolling surface 342a is directed to the radial direction inner side and the axial direction other side. The outer ring other half section 342 is disposed to be separated from the outer ring one half section 341 in the axial direction.

The rolling element 15 is in contact with the first rolling surface 330a and the second rolling surface 330b of the rolling groove 338, the one half section rolling surface 341a, and the other half section rolling surface 342a and configured to roll along the circumferential direction between the inner ring 330 and the outer ring 340. The rolling element 15 is in contact with the first rolling surface 330a and the one half section rolling surface 341a in the same position in the axial direction. The rolling element 15 is in contact with the second rolling surface 330b and the other half section rolling surface 342a in the same position in the axial direction.

The retainer 350 is formed in an annular plate shape extending along the radial direction. The outer diameter of the retainer 350 is slightly smaller than the outer diameter of the outer ring 340. The inner diameter of the retainer 350 is approximately the outer diameter of the inner ring 330. In the retainer 350, ball pockets (not shown in the figure), into which the rolling elements 15 can be inserted, are formed according to the number of rolling elements 15. The ball pockets are recessed from the inner circumferential surface of the retainer 350 toward the radial direction outer side. The ball pockets are formed at equal intervals in the circumferential direction. The thickness of the outer circumferential edge of the retainer 350 is smaller than a gap between the outer ring one half section 341 and the outer ring other half section 342. The retainer 350 is disposed between the outer ring one half section 341 and the outer ring other half section 342. Note that, like the inner circumferential edge of the retainer 50 explained above, the outer circumferential edge of the retainer 350 may project to the axial direction both sides.

The sleeve 60 is formed of a metal material or the like in a cylindrical shape extending along the axial direction and externally inserted over the outer ring one half section 341 and the outer ring other half section 342. The sleeve 60 holds the outer ring 340. The outer ring one half section 341 and the outer ring other half section 342 are fixed to the inner circumferential surface of the sleeve 60 by press-fitting, bonding, welding or the like. In this case, preloads are applied to the outer ring one half section 341 and the outer ring other half section 342 in directions in which the outer ring one half section 341 and the outer ring other half section 342 come close to each other. Specifically, the outer ring one half section 341 is fixed to the sleeve 60 in a state in which the outer ring one half section 341 is pressed toward the outer ring other half section 342 side. The outer ring other half section 342 is fixed to the sleeve 60 in a state in which the outer ring other half section 342 is pressed toward the outer ring one half section 341 side. The arm 8 is externally fit to the sleeve 60.

In this way, according to this embodiment, the outer ring 340 is held by the sleeve 60 externally inserted over the outer ring one half section 341 and the outer ring other half section 342. Therefore, the outer ring one half section 341 and the outer ring other half section 342 can be held by the sleeve 60 in a state in which the preloads are applied thereto. Consequently, the state in which the preloads are applied to the outer ring one half section 341 and the outer ring other half section 342 can be maintained by the roller bearing 311 alone. Therefore, in the configuration in which the outer ring 340 includes the outer ring one half section 341 and the outer ring other half section 342, it is possible to assemble the bearing device 310 without preparing, for example, a member (in this embodiment, the arm 8) to which the bearing device 310 is attached. Therefore, it is possible to improve manufacturing efficiency. It is possible to reduce the cost of the bearing device 310.

Note that, in the second embodiment, the outer ring one half section 341 and the outer ring other half section 342 are fixed to the sleeve 60. However, the present invention is not limited to this.

Figure 13:
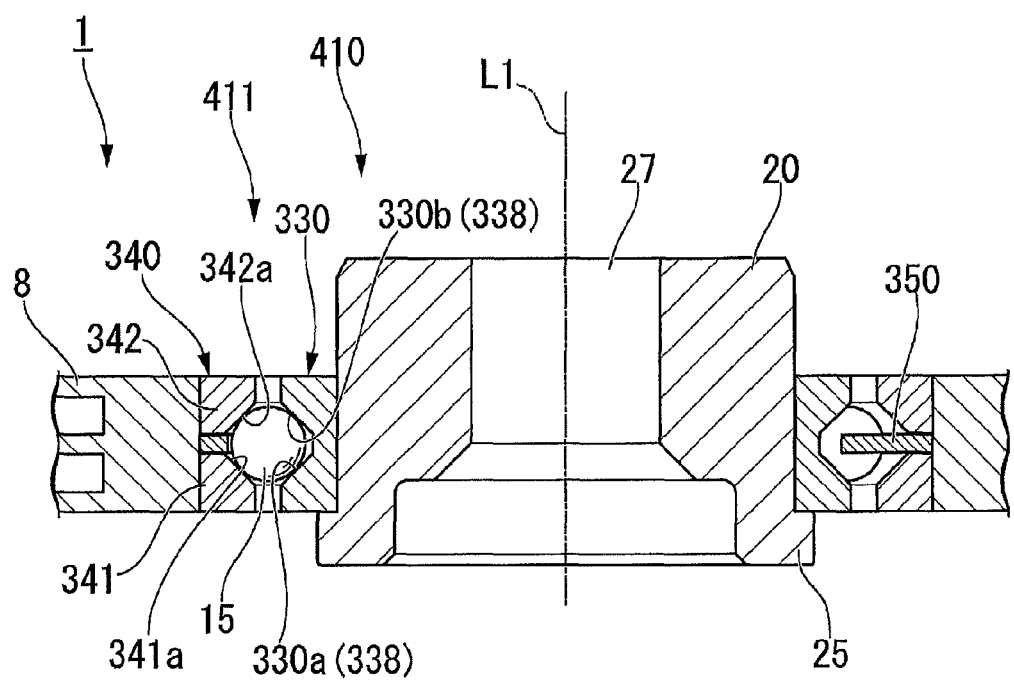
FIG. 13 is an explanatory diagram of a bearing device according to a first modification of the second embodiment and is a sectional view in a portion corresponding to the line II-II in FIG. 1.

FIG. 13 is an explanatory diagram of a bearing device according to a first modification of the second embodiment and is a sectional view in a portion corresponding to the line II-II in FIG. 1.

As shown in FIG. 13, in a roller bearing 411 of a bearing device 410 according to the first modification of the second embodiment, the outer ring one half section 341 and the outer ring other half section 342 may be fixed to the arm 8.

With this configuration, the outer ring one half section 341 and the outer ring other half section 342 can be fixed without using the sleeve 60 in the state in which the preloads are applied thereto. Therefore, it is possible to reduce the number of components. It is possible to reduce the cost of the bearing device 410.

In the information recording and reproducing device 1 according to the first modification of the second embodiment, the outer ring 340 and the arm 8 are formed as separate bodies. However, the present invention is not limited to this.

Figure 14:
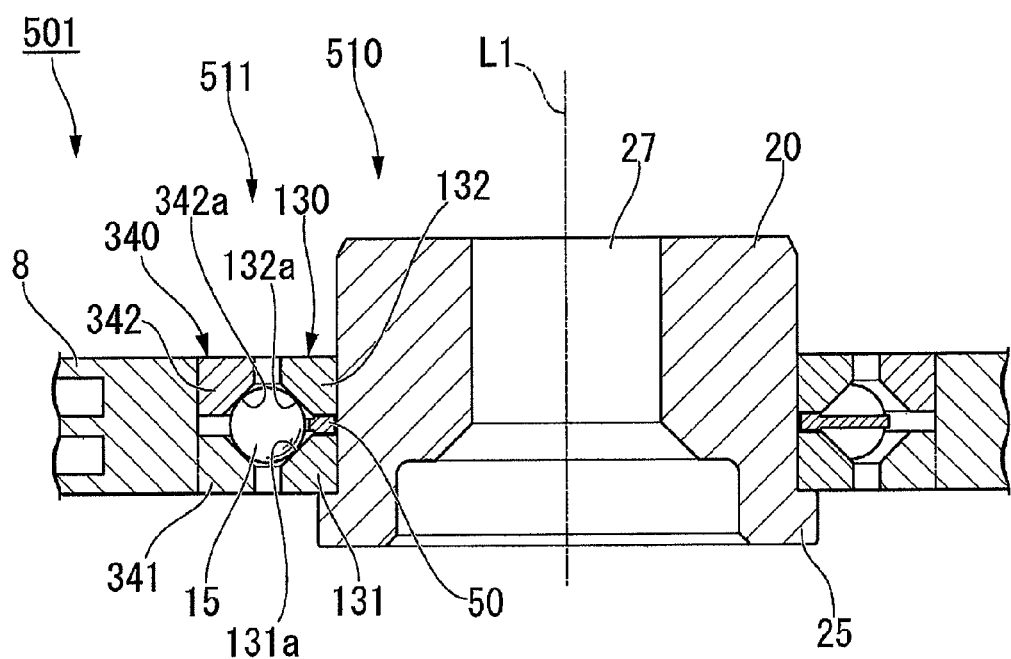
FIG. 14 is an explanatory diagram of a bearing device according to a second modification of the second embodiment and is a sectional view in a portion corresponding to the line II-II in FIG. 1.

FIG. 14 is an explanatory diagram of a bearing device according to a second modification of the second embodiment and is a sectional view in a portion corresponding to the line II-II in FIG. 1.

As shown in FIG. 14, in an information recording and reproducing device 501 according to the second modification of the second embodiment, a roller bearing 511 of a bearing device 510 includes the outer ring one half section 341 formed integrally with the arm 8.

With this configuration, a part (the outer ring one half section 341) of the outer ring 340 and the arm 8 are integrally formed. Therefore, it is possible to reduce the number of components. It is possible to reduce the cost of the information recording and reproducing device 501.

Third Embodiment

A bearing device 610 according to a third embodiment is explained.

Figure 15:
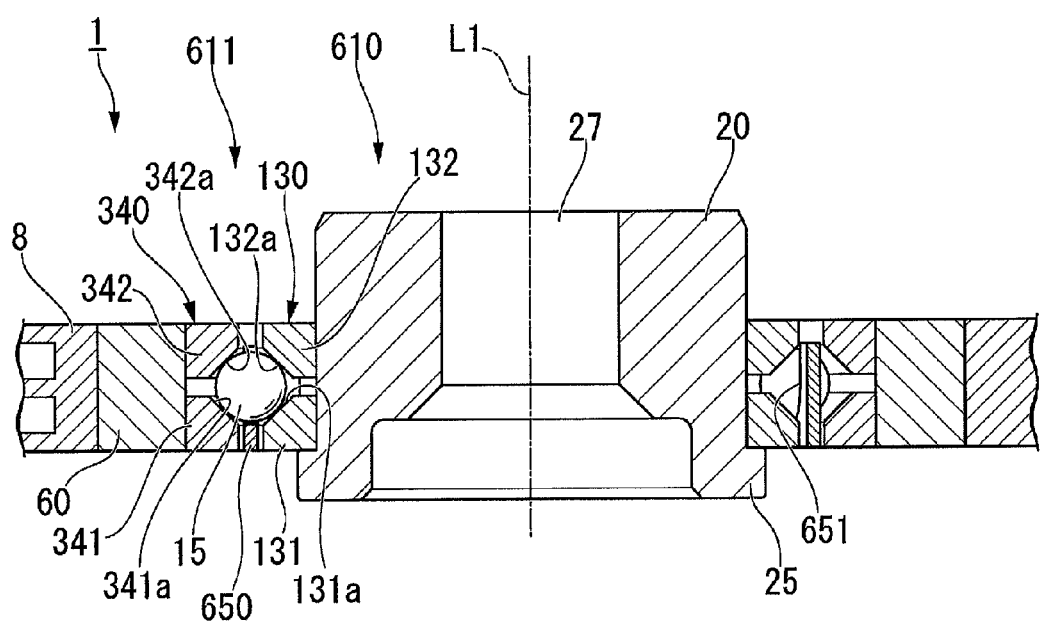
FIG. 15 is an explanatory diagram of a bearing device according to a third embodiment and is a sectional view in a portion corresponding to the line II-II in FIG. 1.

FIG. 15 is an explanatory diagram of the bearing device according to the third embodiment and is a sectional view in a portion corresponding to the line II-II in FIG. 1.

In the first embodiment shown in FIG. 2, the inner ring 30 is divided in the axial direction and the outer ring 40 is integrally formed. The third embodiment shown in FIG. 15 is different from the first embodiment in that both of the inner ring 130 and the outer ring 340 are divided in the axial direction.

As shown in FIG. 15, a roller bearing 611 of a bearing device 610 includes the inner ring 130 and the outer ring 340, the rolling element 15, a retainer 650, and the sleeve 60.

The retainer 650 is disposed between the inner ring 130 and the outer ring 340. The retainer 650 is formed in a cylindrical shape extending along the axial direction. The inner diameter of the retainer 650 is larger than the outer diameter of the inner ring 130. The outer diameter of the retainer 650 is larger than the inner diameter of the outer ring 340. In the retainer 650, ball pockets 651, into which the rolling elements 15 can be inserted, are formed according to the number of the rolling elements 15. The ball pockets 651 are recessed from the end face on the axial direction other side of the retainer 650 toward the axial direction one side and opened on the axial direction other side. The ball pockets 651 are formed at equal intervals in the circumferential direction.

A manufacturing method for the bearing device 610 according to this embodiment is explained below. Please refer to FIG. 15 concerning reference numerals and signs of components of the bearing device 610 in the following explanation.

Figure 16:
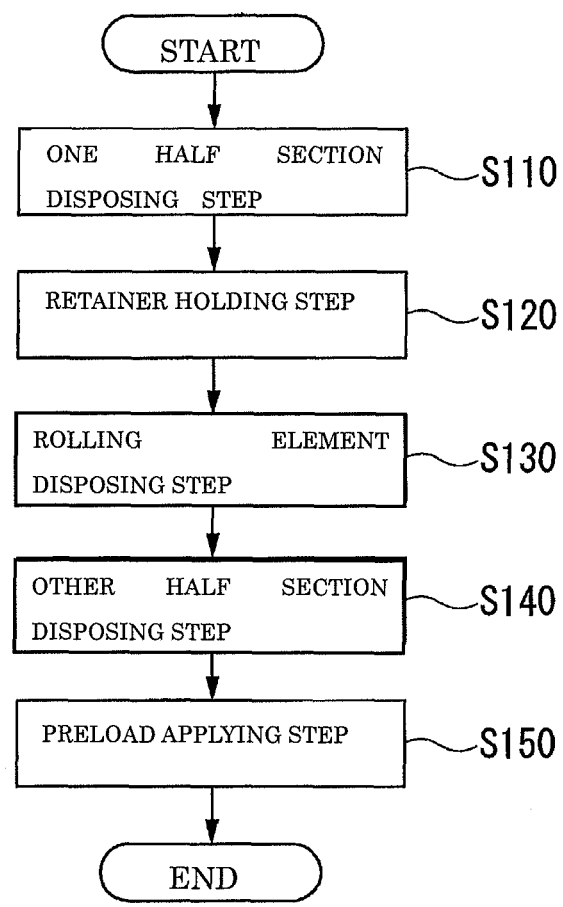
FIG. 16 is a flowchart for explaining a manufacturing method for a bearing device according to the third embodiment.
Figure 17:
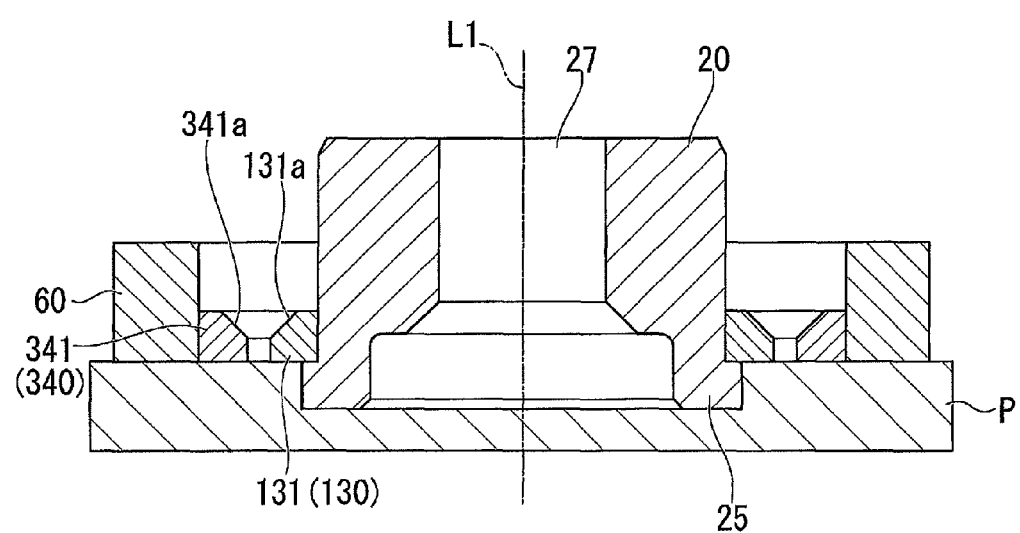
FIG. 17 is a process diagram showing the manufacturing method for the bearing device according to the third embodiment and is a sectional view in a portion corresponding to the line II-II in FIG. 1.
Figure 18:
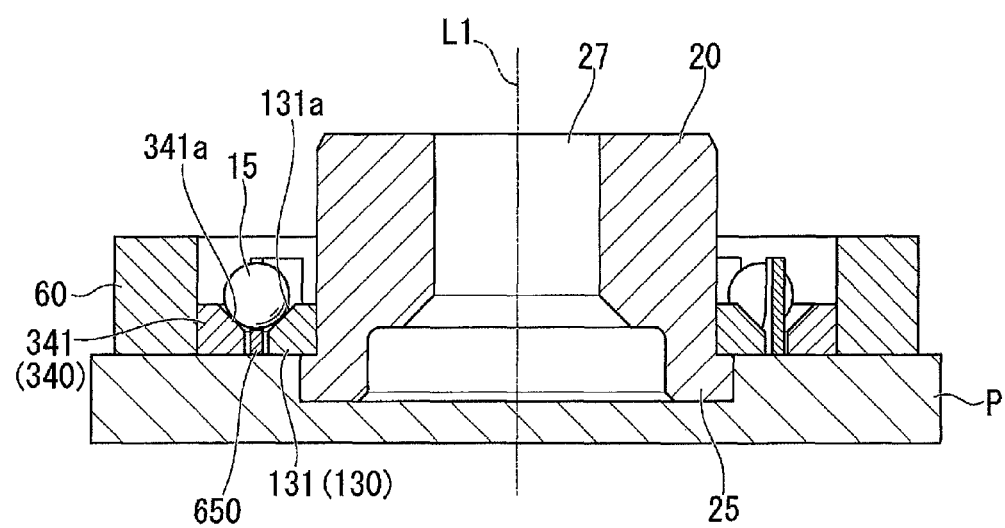
FIG. 18 is a process diagram showing the manufacturing method for the bearing device according to the third embodiment and is a sectional view in the portion corresponding to the line II-II in FIG. 1.
Figure 19:
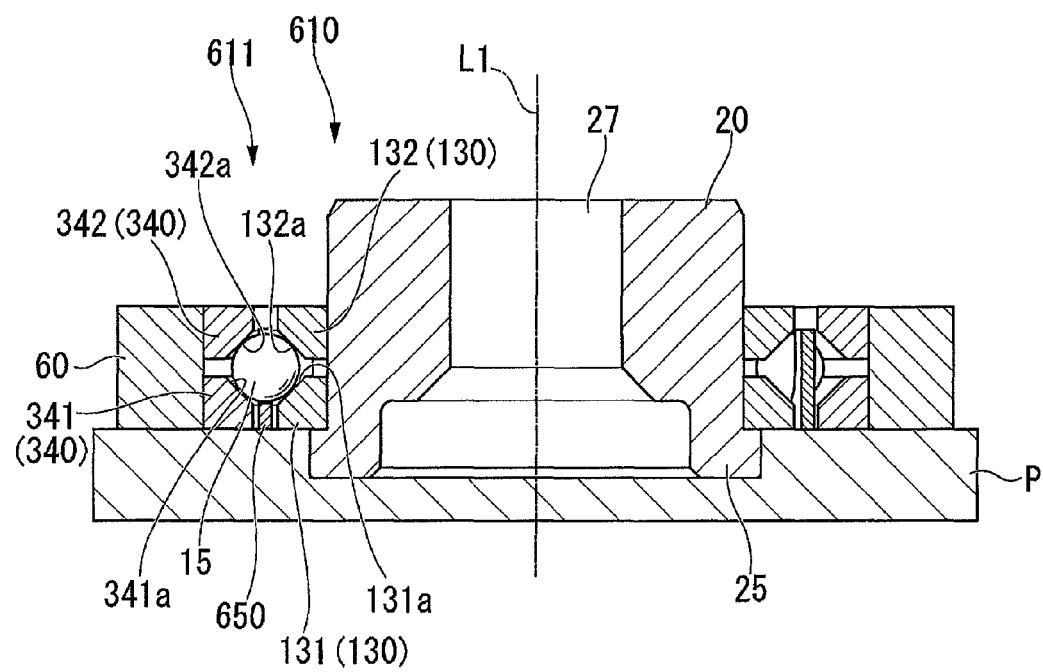
FIG. 19 is a process diagram showing the manufacturing method for the bearing device according to the third embodiment and is a sectional view in the portion corresponding to the line II-II in FIG. 1.

FIG. 16 is a flowchart for explaining the manufacturing method for the bearing device according to the third embodiment. FIGS. 17 to 19 are process diagrams showing the manufacturing method for the bearing device according to the third embodiment and are sectional views in a portion corresponding to the line II-II in FIG. 1.

As shown in FIG. 16, the manufacturing method for the bearing device 610 according to this embodiment includes a one half section disposing step S110, a retainer holding step S120, a rolling element disposing step S130, an other half section disposing step S140, and a preload applying step S150.

First, the one half section disposing step S110 is performed. As shown in FIG. 17, in the one half section disposing step S110, the sleeve 60, the outer ring one half section 341 of the outer ring 340, and the inner ring one half section 131 of the inner ring 130 are inserted over the shaft 20, the outer ring one half section 341 is fixed to the sleeve 60, and the inner ring one half section 131 is fixed to the shaft 20.

Specifically, first, as in the first embodiment, the shaft 20 is placed on the jig P. Subsequently, the inner ring one half section 131 is externally inserted over the shaft 20 and fixed to the shaft 20 in a state in which the inner ring one half section 131 is set in contact with the flange 25 of the shaft 20. The fixing of the inner ring one half section 131 and the shaft 20 is performed by press-fitting, bonding, welding, and the like. The sleeve 60 and the outer ring one half section 341 are externally inserted over the shaft 20 and placed on the principal plane of the jig P. Subsequently, the outer ring one half section 341 is fixed to the sleeve 60. The fixing of the outer ring one half section 341 and the sleeve 60 is performed by press-fitting, bonding, welding, or the like. Consequently, the end face on the axial direction one side of the inner ring one half section 131, the end face on the axial direction one side of the outer ring one half section 341, and the end face on the axial direction one side of the sleeve 60 are located in the same position in the axial direction.

Subsequently, the retainer holding step S120 is performed. In the retainer holding step S120, the retainer 650 is caused to hold the plurality of rolling elements 15.

Specifically, the rolling element 15 is inserted into the ball pocket 651 of the retainer 650. Consequently, the plurality of rolling elements 15 are held by the retainer 650 to be capable of rolling.

Subsequently, the rolling element disposing step S130 is performed. As shown in FIG. 18, in the rolling element disposing step S130, the rolling element 15 is disposed from the other side in the axial direction together with the retainer 650.

Specifically, the retainer 650, in which the plurality of rolling elements 15 are held, is disposed between the inner ring one half section 131 and the outer ring one half section 341 from the other side in the axial direction. Consequently, the rolling elements 15 are disposed between the one half section rolling surface 131a of the inner ring one half section 131 and the one half section rolling surface 341a of the outer ring one half section 341 in a state in which the rolling elements 15 are held by the retainer 650.

Subsequently, the other half section disposing step S140 is performed. As shown in FIG. 19, in the other half section disposing step S140, the inner ring other half section 132 of the inner ring 130 and the outer ring other half section 342 of the outer ring 340 are inserted over the shaft 20.

Specifically, the inner ring other half section 132 is externally inserted over the shaft 20 to set the other half section rolling surface 132a of the inner ring other half section 132 in contact with the rolling element 15. The outer ring other half section 342 is externally inserted over the shaft 20 to set the other half section rolling surface 342a of the outer ring other half section 342 in contact with the rolling element 15. Consequently, the rolling elements 15 are disposed between the one half section rolling surface 131a and the other half section rolling surface 132a of the inner ring 130 and the one half section rolling surface 341a and the other half section rolling surface 342a of the outer ring 340.

Subsequently, the preload applying step S150 is performed. In the preload applying step S150, while the inner ring other half section 132 is pressed toward the inner ring one half section 131, the inner ring other half section 132 is fixed to the shaft 20 and the outer ring other half section 342 is fixed to the sleeve 60.

Specifically, in a state in which the inner ring other half section 132 is pressed toward the inner ring one half section 131 side with a predetermined force, the inner ring other half section 132 is fixed to the shaft 20. The fixing of the inner ring other half section 132 and the shaft 20 is performed by press-fitting, bonding, welding, or the like. In a state in which the outer ring other half section 342 is pressed toward the outer ring one half section 341 side with a predetermined force, the outer ring other half section 342 is fixed to the sleeve 60. The fixing of the outer ring other half section 342 and the sleeve 60 is performed by press-fitting, bonding, welding, or the like. Consequently, the rolling element 15 is pressed in the radial direction to eliminate inner gaps between the inner and outer rings 130 and 340 and the rolling element 15.

Finally, the jig P is detached, whereby the bearing device 610 shown in FIG. 15 is completed.

Note that, in the preload applying step S150, the inner ring other half section 132 and the outer ring other half section 342 are fixed to the shaft 20 or the sleeve 60 in a state in which the preloads are applied thereto. However, the present invention is not limited to this. The preload only has to be applied to one of the inner ring other half section 132 and the outer ring other half section 342. That is, the inner ring other half section 132 may be fixed to the shaft 20 in the state in which the inner ring other half section 132 is pressed toward the inner ring one half section 131 side with the predetermined force in a state in which the outer ring other half section 342 is fixed to the sleeve 60. The outer ring other half section 342 may be fixed to the sleeve 60 in the state in which the outer ring other half section 342 is pressed toward the outer ring one half section 341 side with the predetermined force in a state in which the inner ring other half section 132 is fixed to the shaft 20.

In this way, according to this embodiment, the inner ring 130 and the outer ring 340 respectively include the one half sections (the inner ring one half section 131 and the outer ring one half section 341) and the other half sections (the inner ring other half section 132 and the outer ring other half section 342). Therefore, when the roller bearing 611 is assembled, it is possible to dispose the rolling element 15 after the one half sections 131 and 341 are disposed and before the other half sections 132 and 342 are disposed. It is possible to easily dispose the rolling element 15 between the inner ring 130 and the outer ring 340.

In this case, since the rolling element 15 can be disposed together with the retainer 650 in the rolling element disposing step S130 in a state in which the retainer 650 is caused to hold the rolling element 15 in the retainer holding step S120, the assembly of the bearing device 610 is easily automated. Therefore, it is possible to improve manufacturing efficiency. It is possible to reduce manufacturing cost and realize the bearing device 610 that can be reduced in cost.

Moreover, since the retainer 650 is formed in the cylindrical shape, it is possible to realize a state in which the retainer 650 is not in contact with the inner ring 130 and the outer ring 340. Therefore, it is possible to reduce sliding resistance between the retainer 650 and the inner and outer rings 130 and 340. It is possible to realize the bearing device 610 having low torque.

Fourth Embodiment

An information recording and reproducing device 701 and a bearing device 710 according to a fourth embodiment are explained.

Figure 20:
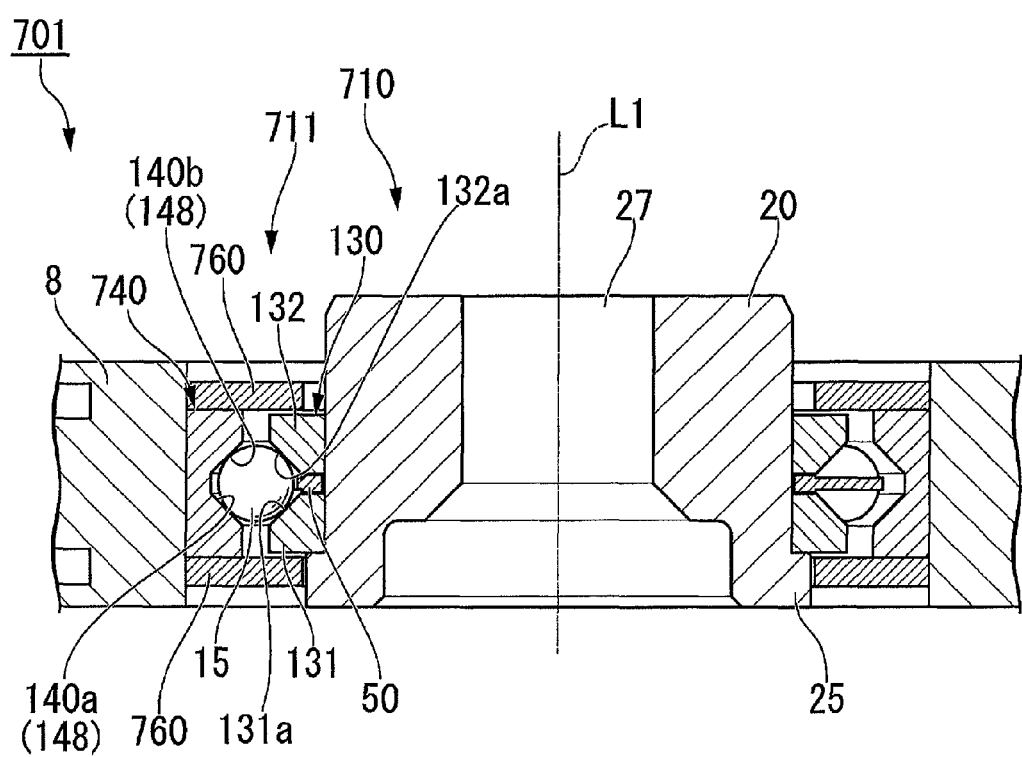
FIG. 20 is an explanatory diagram showing a bearing device according to a fourth embodiment and is a sectional view in a portion equivalent to line II-II in FIG. 1.

FIG. 20 is an explanatory diagram of the bearing device according to the fourth embodiment and is a sectional view in a portion corresponding to the line II-II in FIG. 1.

The fourth embodiment shown in FIG. 20 is different from the first embodiment shown in FIG. 2 in that a roller bearing 711 of the bearing device 710 includes a pair of seal members 760.

As shown in FIG. 20, the roller bearing 711 includes the inner ring 130, an outer ring 740, the rolling element 15, the retainer 50, and the pair of seal members 760.

The outer ring 740 is different from the outer ring 140 in that a dimension in the axial direction is larger than the inner ring 130. The outer ring 740 is provided to project further to both sides in the axial direction than the inner ring 130.

The seal members 760 are formed of a metal material or the like in an annular plate shape. The seal members 760 cover a space between the inner ring 130 and the outer ring 740 from the outer side in the axial direction. The inner diameter of the seal members 760 is smaller than the outer diameter of the inner ring 130 and larger than the outer diameter of the shaft 20. The outer diameter of the seal members 760 is equivalent to the outer diameter of the outer ring 740 (i.e., the inner diameter of the inner circumferential surface of the arm 8).

A dimension in the axial direction of the roller bearing 711 is smaller than the arm 8. The roller bearing 711 overlaps the arm 8 over the entire axial direction. The seal members 760 are fixed to the inner circumferential surface of the arm 8 and are in contact with both the end faces in the axial direction of the outer ring 740. Further, since the outer ring 740 projects further to both the sides in the axial direction than the inner ring 130, the seal members 760 are provided to overlap the axial direction both end faces of the inner ring 130 when viewed from the axial direction in a state in which the seal members 760 are separated from the axial direction both end faces of the inner ring 130.

In this way, according to this embodiment, the roller bearing 711 includes the seal members 760 that cover the space between the inner ring 130 and the outer ring 740 from the outer side in the axial direction. Therefore, it is possible to suppress foreign matters or the like from entering between the inner ring 130 and the outer ring 740 to deteriorate rotation performance of the roller bearing 711. It is possible to suppress, with the seal members 760, scattering of grease and emission of outgas to the outside of the bearing device 710.

The seal members 760 are provided in contact with the end faces of the outer ring 740 projecting further in the axial direction than the inner ring 130. Therefore, it is possible to easily prevent the seal members 760 from coming into contact with the inner ring 130. Consequently, when the inner ring 130 and the outer ring 740 relatively rotate, it is possible to prevent occurrence of sliding resistance due to contact of the inner ring 130 and the seal members 760. Therefore, it is possible to suppress rotation performance of the roller bearing 711 from being deteriorated.

Since the outer ring 740 is projected further in the axial direction than the inner ring 130, it is possible to set a dimension in the axial direction of the outer ring 740 larger than the inner ring 130. Consequently, when the member (in this embodiment, the arm 8), to which the bearing device 710 is attached, is externally fit to the outer ring 740, since a contact area between the member and the outer ring 740 can be increased, it is possible to stably fix the member. Therefore, it is possible to realize the bearing device 710 adaptable to high-speed rotation.

In the information recording and reproducing device 701 according to this embodiment, the roller bearing 711 including the seal members 760 overlaps the arm 8 over the entire axial direction. Therefore, it is possible to prevent the roller bearing 711 from projecting from the arm 8 in the axial direction. It is possible to surely reduce the thickness of the information recording and reproducing device 701.

Note that, in this embodiment, the seal members 760 are provided in contact with the end faces of the outer ring 740. However, the present invention is not limited to this. For example, seal members may be fit to the inner circumferential surface at the end portion in the axial direction of the outer ring 740. Even in this case, the outer ring 740 projects further to both the sides in the axial direction than the inner ring 130. It is possible to easily prevent the seal members from coming into contact with the inner ring 130. It is possible to prevent occurrence of sliding resistance due to contact of the inner ring 130 and the seal members.

In this embodiment, the outer ring 740 projects further in the axial direction than the inner ring 130. However, the present invention is not limited to this. An inner ring may project further in the axial direction than an outer ring. Seal members may be provided in contact with end portions of the inner ring.

Note that the present invention is not limited to the embodiments explained with reference to the drawings. Various modifications are conceivable in a technical scope of the present invention.

For example, in the embodiments, the bearing device is applied as the turning shaft of the arm 8. However, the application of the bearing device is not limited to this. For example, the bearing device may be applied as a rotating shaft of the spindle motor 7 that rotates the disk D of the information recording and reproducing device 1. The bearing device may be applied as a turning shaft of a polygon mirror for scanning a laser beam source.

The embodiments and the modifications of the embodiments adopt so-called fixed position preloading for applying preloads to the one half sections and the other half sections by fixing the one half sections and the other half sections to the shaft 20, the sleeve 60, or the like in a state in which the one half sections and the other half sections are relatively pressed along the axial direction. On the other hand, it is also possible to adopt so-called fixed pressure preloading for applying preloads by, for example, providing an urging member and keeping the one half sections and the other half sections in a state in which the one half sections and the other half sections are relatively pressed along the axial direction.

Besides, it is possible to replace the constituent elements in the embodiments with well-known constituent elements as appropriate without departing from the spirit of the present invention. The embodiments and the modifications may be combined as appropriate.

What is claimed is:

1. A bearing device comprising:
   a shaft; and
   a roller bearing externally inserted over the shaft, wherein the roller bearing includes:
   an inner ring disposed coaxially with a center axis of the shaft;
   an outer ring surrounding the inner ring from an outer side in a radial direction of the shaft,
   a plurality of rolling elements held between the inner ring and the outer ring to be capable of rolling, and
   a retainer formed in an annular shape and configured to hold the rolling elements to be capable of rolling, wherein
   at least one of the inner ring is divided into one half section disposed on one side in an axial direction of the center axis and the other half section disposed on the other side in the axial direction,
   the one half section is in contact with the rolling elements from the one side toward the other side in the axial direction,
   the other half section is in contact with the rolling elements from the other side toward the one side in the axial direction, an inner circumferential edge of the retainer projects in the axial direction and is disposed between the one half section and the other half section, and preloads are applied to the one half section and the other half section in directions in which the one half section and the other half section are brought close to each other.

2. The bearing device according to claim 1, wherein both the inner ring and the outer ring 4e are divided into the one half section and the other half section.

3. The bearing device according to claim 2, wherein the outer ring is held by an externally inserted member externally inserted over the one half section and the other half section.

4. The bearing device according to claim 3, wherein one of the one half section and the other half section of the outer ring is formed integrally with the externally inserted member.

5. The bearing device according to claim 1, wherein the retainer is formed in a cylindrical shape extending along the axial direction, the retainer having ball pockets that are open in the axial direction for holding the rolling elements to be capable of rolling, and the inner ring and the outer ring are respectively divided into the one half sections and the other half sections.

6. A manufacturing method for the bearing device according to claim 5, comprising:

inserting, over the shaft, an externally inserted member externally inserted over the one half section and the other half section of the outer ring, the one half section of the outer ring, and the one half section of the inner ring, fixing the one half section of the outer ring to the externally inserted member, and fixing the one half section of the inner ring to the shaft;

causing the retainer to hold the plurality of rolling elements;

disposing the rolling elements from the other side in the axial direction together with the retainer;

inserting the other half section of the outer ring and the other half section of the inner ring over the shaft; and fixing the other half section of the inner ring to the shaft and fixing the one half section of the outer ring to the externally inserted member while pressing the other half section of at least one member of the inner ring and the outer ring toward the one half section of the one member.

7. The bearing device according to claim 1, wherein the inner ring and the outer ring respectively include contact surfaces provided to be capable of coming into contact with the rolling elements, and the contact surfaces are formed in an arcuate shape in a sectional view passing the center axis.

8. The bearing device according to claim 1, wherein a contact angle of the rolling elements and the outer and inner rings with respect to the radial direction is larger than 0° and smaller than 45° in a sectional view passing the center axis.

9. An information recording and reproducing device comprising:

the bearing device according to claim 1;

a housing configured to support one side end portion of the bearing device;

a turning member externally fit to the bearing device and configured to turn around the center axis of the shaft; and a slider attached to the turning member and configured to record information in and reproduce the information from a magnetic recording medium.

10. The information recording and reproducing device according to claim 9, wherein at least a part of the outer ring and the turning member are integrally formed.

11. The information recording and reproducing device according to claim 9, wherein the roller bearing overlaps the turning member over the entire axial direction.

12. A manufacturing method for the bearing device according to claim 1, comprising:

inserting the outer ring and the one half section over the shaft and fixing the one half section to the shaft;

disposing the retainer capable of holding the rolling elements;

disposing the rolling elements from the other side of the axial direction;

inserting the other half section over the shaft; and fixing the other half section to the shaft while pressing the other half section toward the one half section.

13. A bearing device comprising:

a shaft; and a roller bearing externally inserted over the shaft, wherein the roller bearing includes:

an inner ring disposed coaxially with a center axis of the shaft;

an outer ring surrounding the inner ring from an outer side in a radial direction of the shaft; and a plurality of rolling elements held between the inner ring and the outer ring to be capable of rolling, wherein at least one of the inner ring and the outer ring is divided into one half section disposed on one side in an axial direction of the center axis and the other half section disposed on the other side in the axial direction, the one half section is in contact with the rolling elements from the one side toward the other side in the axial direction, preloads are applied to the one half section and the other half section in directions in which the one half section and the other half section are brought close to each other, and at least a part of the inner ring is formed integrally with the shaft.

14. A bearing device comprising:

a shaft; and a roller bearing externally inserted over the shaft, wherein the roller bearing includes:

an inner ring disposed coaxially with a center axis of the shaft;

an outer ring surrounding the inner ring from an outer side in a radial direction of the shaft; and a plurality of rolling elements held between the inner ring and the outer ring to be capable of rolling, wherein at least one of the inner ring and the outer ring is divided into one half section disposed on one side in an axial direction of the center axis and the other half section disposed on the other side in the axial direction, the one half section is in contact with the rolling elements from the one side toward the other side in the axial direction, preloads are applied to the one half section and the other half section in directions in which the one half section and the other half section are brought close to each other, the inner ring and the outer ring respectively include contact surfaces provided to be capable of coming into contact with the rolling elements, and the contact surfaces are formed in a linear shape in a sectional view passing the center axis.

15. A bearing device comprising:

a shaft; and a roller bearing externally inserted over the shaft, wherein the roller bearing includes:

an inner ring disposed coaxially with a center axis of the shaft;

an outer ring surrounding the inner ring from an outer side in a radial direction of the shaft;

a plurality of rolling elements held between the inner ring and the outer ring to be capable of rolling, and seal members configured to cover a space between the inner ring and the outer ring from an outer side in the axial direction, wherein one member of the inner ring and the outer ring projects further in the axial direction than the other member, the seal members are provided to be in contact with end portions in the axial direction of the one member and overlap the other member when viewed from the axial direction, at least one of the inner ring and the outer ring is divided into one half section disposed on one side in an axial direction of the center axis and the other half section disposed on the other side in the axial direction, the one half section is in contact with the rolling elements from the one side toward the other side in the axial direction, the other half section is in contact with the rolling elements from the one side toward the other side in the axial direction, and preloads are applied to the one half section and the other half section in directions in which the one half section and the other half section are brought close to each other.

16. The bearing device according to claim 15, wherein the one member is the outer ring.

* * * * *